(12) United States Patent
Schindler et al.

(10) Patent No.: US 12,517,051 B2
(45) Date of Patent: Jan. 6, 2026

(54) SYSTEMS AND METHODS FOR DETECTION OF CONTAMINANTS ON SURFACES

(71) Applicant: PathSpot Technologies Inc., New York, NY (US)

(72) Inventors: Christine E. Schindler, Jersey City, NJ (US); Taylor D. Waanders, Jersey City, NJ (US)

(73) Assignee: PathSpot Technologies, Inc., New York, NY (US)

( * ) Notice: Subject to any disclaimer, the term of this patent is extended or adjusted under 35 U.S.C. 154(b) by 6 days.

(21) Appl. No.: 17/510,156

(22) Filed: Oct. 25, 2021

(65) Prior Publication Data

US 2022/0042912 A1    Feb. 10, 2022

Related U.S. Application Data

(63) Continuation of application No. 16/155,338, filed on Oct. 9, 2018, now Pat. No. 11,156,554.
(Continued)

(51) Int. Cl.
  *G01N 21/64* (2006.01)
  *G01N 21/94* (2006.01)

(52) U.S. Cl.
  CPC ..... *G01N 21/6447* (2013.01); *G01N 21/6428* (2013.01); *G01N 21/6456* (2013.01); *G01N 21/6486* (2013.01); *G01N 21/94* (2013.01); *G01N 2021/6417* (2013.01); *G01N 21/645* (2013.01); *G01N 2201/0221* (2013.01)

(58) Field of Classification Search
  None
  See application file for complete search history.

(56) References Cited

U.S. PATENT DOCUMENTS 5,515,162 A    5/1996  Vezard
5,621,215 A    4/1997  Waldroup
(Continued)

OTHER PUBLICATIONS

Supplementary European Search Report for EP 18865790 dated May 18, 2021, 1 page.
(Continued)

*Primary Examiner* — David P Porta
*Assistant Examiner* — Djura Malevic
(74) *Attorney, Agent, or Firm* — Lowenstein Sandler LLP

(57) ABSTRACT

A contaminant detection system for a portable computer with the computer having a camera, an integral screen and central processing unit (CPU; a. an enclosure having at least one grasper disposed for coupling the system to the portable computer; b. a light emitter capable of generating light of with least one excitation wavelength for a contaminant present in its output spectrum with output of the emitter oriented into the field of view of the camera; c. electronic communication between the computer and the emitter; c. software loaded onto the computer capable of (1) activating the emitter, (2) comparing a scene recorded by the camera to at least one emission wavelength for the specific contaminant corresponding to the excitation wavelength, and (3) displaying an output on the computer's screen corresponding to the areas within the camera's field of view where the contaminant is present in amounts greater than a detection threshold.

14 Claims, 26 Drawing Sheets

Related U.S. Application Data

(60) Provisional application No. 62/569,949, filed on Oct. 9, 2017.

(56) References Cited

U.S. PATENT DOCUMENTS

| | | | |
|---|---|---|---|
| 5,821,546 A | 10/1998 | Xiao | |
| 5,846,830 A | 12/1998 | Demello | |
| 5,895,921 A | 4/1999 | Waldroup | |
| 5,914,247 A | 6/1999 | Casey | |
| 6,031,461 A | 2/2000 | Lynn | |
| 6,147,607 A | 11/2000 | Lynn | |
| 6,236,317 B1 | 5/2001 | Cohen | |
| 6,392,546 B1 | 5/2002 | Smith | |
| 6,426,701 B1 | 7/2002 | Levy | |
| 6,882,278 B2 | 4/2005 | Winings | |
| 6,956,498 B1 | 10/2005 | Gauthier | |
| 7,053,524 B2 | 5/2006 | Edmonson | |
| 7,242,307 B1 | 7/2007 | LeBlond | |
| 7,247,140 B2 | 7/2007 | Ophardt | |
| 7,451,894 B2 | 11/2008 | Ophardt | |
| 7,455,197 B2 | 11/2008 | Ophardt | |
| 7,530,477 B2 | 5/2009 | Ophardt | |
| 7,581,434 B1* | 9/2009 | Discenzo | G01N 33/2888 |
| | | | 73/53.01 |
| 7,597,122 B1 | 10/2009 | Smith | |
| 7,651,843 B2 | 1/2010 | Stubbs | |
| 7,659,824 B2 | 2/2010 | Prodanovich | |
| 7,748,573 B2 | 7/2010 | Anhuf | |
| 7,783,380 B2 | 8/2010 | York | |
| 7,787,111 B2 | 8/2010 | Kim | |
| 7,898,407 B2 | 3/2011 | Hufton | |
| 7,936,275 B2 | 5/2011 | Bolling | |
| 7,980,421 B2 | 7/2011 | Ophardt | |
| 8,196,810 B2 | 6/2012 | Sahud | |
| 8,237,558 B2 | 8/2012 | Seyed Momen | |
| 8,245,877 B2 | 8/2012 | Ophardt | |
| 8,255,026 B1* | 8/2012 | Al-Ali | A61B 5/14551 |
| | | | 600/323 |
| 8,350,706 B2 | 1/2013 | Wegelin | |
| 8,377,229 B2 | 2/2013 | Barnhill | |
| 8,395,515 B2 | 3/2013 | Tokhtuev | |
| 8,482,406 B2 | 7/2013 | Snodgrass | |
| 8,622,243 B2 | 1/2014 | Ophardt | |
| 8,639,527 B2 | 1/2014 | Rensvold | |
| 8,684,236 B2 | 4/2014 | Ophardt | |
| 8,733,596 B2 | 5/2014 | Ophardt | |
| 8,847,727 B2 | 9/2014 | Shapiro | |
| 8,905,265 B2* | 12/2014 | Muderlak | A47K 5/1207 |
| | | | 222/38 |
| 8,998,036 B2* | 4/2015 | Zhou | B65D 47/2031 |
| | | | 222/481.5 |
| 9,000,930 B2 | 4/2015 | Pelland | |
| 9,147,334 B2 | 9/2015 | Long | |
| 9,335,275 B2* | 5/2016 | Gloger | G01N 21/8851 |
| 9,424,735 B2 | 8/2016 | Haidegger | |
| 9,437,103 B2* | 9/2016 | Ophardt | C12Q 1/04 |
| 9,442,070 B1* | 9/2016 | Hug | G01N 21/6486 |
| 9,449,219 B2* | 9/2016 | Bilet | G16Z 99/00 |
| 9,476,865 B2 | 10/2016 | Subbiah | |
| 9,551,616 B2 | 1/2017 | McQuilkin | |
| 9,641,994 B2 | 5/2017 | Balsan | |
| 9,645,561 B2 | 5/2017 | Borke | |
| 9,664,686 B2* | 5/2017 | Perrett | G01N 21/6456 |
| 9,672,726 B2 | 6/2017 | Borke | |
| 9,721,452 B2 | 8/2017 | Felch | |
| 9,824,569 B2 | 11/2017 | Snodgrass | |
| 9,830,764 B1 | 11/2017 | Murphy | |
| 9,836,950 B2 | 12/2017 | Levchenko | |
| 9,846,984 B2* | 12/2017 | Liu | G07D 7/12 |
| 9,881,485 B2 | 1/2018 | Hajdenberg | |
| 9,949,676 B2* | 4/2018 | Al-Ali | A61B 5/14551 |
| 9,972,193 B2 | 5/2018 | Laufer | |
| 10,008,098 B2 | 6/2018 | Ophardt | |
| 10,022,741 B2* | 7/2018 | Fuller | B01F 33/841 |
| 10,037,678 B2 | 7/2018 | Becker | |
| 10,078,956 B1 | 9/2018 | Kusens | |
| 10,121,149 B2 | 11/2018 | Davis | |
| 10,130,221 B2 | 11/2018 | Borke | |
| 10,149,575 B2* | 12/2018 | Tojek | B05B 15/62 |
| 10,189,698 B2 | 1/2019 | Proper | |
| 10,225,522 B1 | 3/2019 | Kusens | |
| 10,395,267 B2 | 8/2019 | Becker | |
| 10,466,176 B2* | 11/2019 | Rochford | G01N 21/8803 |
| 10,529,219 B2 | 1/2020 | Herdt | |
| 10,598,596 B1* | 3/2020 | Hug | G01N 21/64 |
| 10,656,015 B2 | 5/2020 | McQuilkin | |
| 10,660,482 B2 | 5/2020 | Kamatchi | |
| 10,719,790 B2 | 7/2020 | Becker | |
| 10,753,863 B1* | 8/2020 | Hug | G01J 3/2803 |
| 10,890,533 B1* | 1/2021 | Hug | G01J 3/36 |
| 10,961,558 B2* | 3/2021 | Choi | G01J 3/4406 |
| 10,993,643 B2* | 5/2021 | Al-Ali | A61B 5/14551 |
| 11,067,784 B2* | 7/2021 | Rochford | G03B 15/02 |
| 11,154,198 B2* | 10/2021 | Dacosta | A61B 5/742 |
| 11,156,554 B2* | 10/2021 | Waanders | G01N 21/6486 |
| 11,193,894 B2* | 12/2021 | Waanders | G01N 21/94 |
| 11,389,035 B2* | 7/2022 | Lang | A47K 5/1217 |
| 11,448,598 B1* | 9/2022 | Bhartia | G01N 21/359 |
| 11,490,769 B1* | 11/2022 | Bindler | A47K 5/09 |
| 11,532,401 B2* | 12/2022 | Kushida | G16H 50/30 |
| 11,538,329 B2* | 12/2022 | Bolling | G08B 21/245 |
| 11,551,807 B2* | 1/2023 | Adiri | G06T 7/0012 |
| 11,600,116 B2* | 3/2023 | Zu | G06V 40/28 |
| 11,607,088 B2* | 3/2023 | Yang | F04B 43/04 |
| 11,615,694 B2* | 3/2023 | Kelly | G08B 21/245 |
| | | | 340/540 |
| 11,640,057 B2* | 5/2023 | Palacios | G02F 1/1343 |
| | | | 349/139 |
| 11,647,871 B2* | 5/2023 | Yang | H05K 13/00 |
| | | | 222/173 |
| 11,673,046 B2* | 6/2023 | Comer | G06T 1/20 |
| | | | 463/31 |
| 11,857,315 B2* | 1/2024 | Al-Ali | A61B 5/14551 |
| 2002/0004995 A1 | 1/2002 | France | |
| 2002/0019709 A1 | 2/2002 | Segal | |
| 2002/0135486 A1 | 9/2002 | Brohagen | |
| 2003/0019536 A1 | 1/2003 | Smith | |
| 2003/0030562 A1 | 2/2003 | Lane | |
| 2003/0164456 A1* | 9/2003 | Petrich | G01N 21/6486 |
| | | | 250/458.1 |
| 2003/0173525 A1 | 9/2003 | Seville | |
| 2004/0034289 A1 | 2/2004 | Teller | |
| 2004/0150527 A1 | 8/2004 | Harper | |
| 2004/0193449 A1 | 9/2004 | Wildman | |
| 2005/0035862 A1 | 2/2005 | Wildman | |
| 2005/0114154 A1 | 5/2005 | Wolkowicz | |
| 2005/0212869 A1 | 9/2005 | Ellson | |
| 2006/0008866 A1* | 1/2006 | Flick | G01N 21/645 |
| | | | 435/808 |
| 2006/0132316 A1 | 6/2006 | Wildman | |
| 2006/0160059 A1 | 7/2006 | Dompier | |
| 2006/0208887 A1 | 9/2006 | Fields | |
| 2007/0096930 A1 | 5/2007 | Cardoso | |
| 2007/0176774 A1 | 8/2007 | Jahrling | |
| 2007/0182571 A1 | 8/2007 | Kennish | |
| 2007/0257803 A1 | 11/2007 | Munro | |
| 2008/0001763 A1 | 1/2008 | Raja | |
| 2008/0033751 A1 | 2/2008 | Greene | |
| 2008/0103636 A1 | 5/2008 | Glenn | |
| 2009/0276239 A1 | 11/2009 | Swart | |
| 2009/0327280 A1 | 12/2009 | Young | |
| 2010/0140499 A1 | 6/2010 | Casale | |
| 2010/0153374 A1 | 6/2010 | LeBlond | |
| 2010/0282772 A1 | 11/2010 | Ionidis | |
| 2010/0328076 A1 | 12/2010 | Kyle | |
| 2011/0017769 A1* | 1/2011 | Ophardt | A47K 5/1217 |
| | | | 4/628 |
| 2011/0024449 A1 | 2/2011 | Walters | |
| 2011/0121974 A1 | 5/2011 | Tenarvitz | |
| 2011/0148586 A1 | 6/2011 | Anderson | |
| 2011/0234598 A1 | 9/2011 | Scarola | |
| 2011/0316701 A1 | 12/2011 | Alper | |

(56) References Cited

U.S. PATENT DOCUMENTS

| | | | | |
|---|---|---|---|---|
| 2012/0119110 A1* | 5/2012 | Hirsch | G01N 21/94 | |
| | | | 345/666 | |
| 2012/0319816 A1* | 12/2012 | Al-Ali | A61B 5/14551 | |
| | | | 340/5.8 | |
| 2013/0122807 A1 | 5/2013 | Tenarvitz | | |
| 2013/0332184 A1 | 12/2013 | Burnham | | |
| 2014/0241571 A1* | 8/2014 | Bilet | G06T 7/0004 | |
| | | | 382/103 | |
| 2014/0244344 A1 | 8/2014 | Bilet | | |
| 2014/0253336 A1 | 9/2014 | Ophardt | | |
| 2014/0267031 A1* | 9/2014 | Huebner | G06F 3/0346 | |
| | | | 345/158 | |
| 2014/0285344 A1* | 9/2014 | Best | G08B 21/245 | |
| | | | 340/573.1 | |
| 2014/0320291 A1* | 10/2014 | De Luca | G08B 21/20 | |
| | | | 340/573.1 | |
| 2015/0194043 A1 | 7/2015 | Dunn | | |
| 2015/0228181 A1 | 8/2015 | Himmelmann | | |
| 2015/0278456 A1 | 10/2015 | Bermudez Rodriguez | | |
| 2016/0045114 A1* | 2/2016 | Dacosta | A61B 5/742 | |
| | | | 600/476 | |
| 2016/0249774 A1 | 9/2016 | Ophardt | | |
| 2016/0270029 A1 | 9/2016 | Herring | | |
| 2016/0316975 A1 | 11/2016 | Ophardt | | |
| 2017/0073722 A1* | 3/2017 | Kanhye | G01N 21/6428 | |
| 2018/0078958 A1* | 3/2018 | Ophardt | B05B 11/0008 | |
| 2018/0333087 A1* | 11/2018 | Al-Ali | A61B 5/14551 | |
| 2018/0348145 A1 | 12/2018 | Witte | | |
| 2019/0107490 A1* | 4/2019 | Schindler | G01N 21/6447 | |
| 2020/0191726 A1* | 6/2020 | Waanders | G01N 21/6486 | |
| 2020/0320330 A1* | 10/2020 | Ophardt | A47K 5/1217 | |
| 2021/0251536 A1* | 8/2021 | Al-Ali | A61B 5/14551 | |
| 2022/0015585 A1* | 1/2022 | Ophardt | G01J 5/0025 | |
| 2022/0042912 A1* | 2/2022 | Schindler | G01N 21/6447 | |
| 2022/0091011 A1* | 3/2022 | Steltenkamp | G01N 15/0606 | |
| 2023/0077894 A1* | 3/2023 | Ophardt | G08B 21/18 | |

OTHER PUBLICATIONS

International Search Report and Written Opinion for PCT/US2018/055015 dated Feb. 1, 2019, 11 pages.

International Search Report and Written Opinion for PCT/US2020/025167 dated May 22, 2020, 7 pages.

* cited by examiner

SYSTEMS AND METHODS FOR DETECTION OF CONTAMINANTS ON SURFACES

PRIORITY CROSS-REFERENCE TO RELATED APPLICATIONS

This application is a continuation of U.S. patent application Ser. No. 16/155,338, filed on Oct. 9, 2018, which claims the benefit of priority to U.S. Provisional Application No. 62/569,949, filed on Oct. 9, 2017, which are hereby incorporated by reference herein in their entirety.

TECHNICAL FIELD

Embodiments of the technology relate, in general, to visible light fluorescent spectroscopy technology, and in particular to the use of visible light fluorescent technology in combination with mobile technology as a detection tool.

In the disclosure that follows, the words "contaminant" and "pathogen" are used generally interchangeably as they are understood in at least the medical, agriculture, food processing, and food service industries with the broadest applicable meaning being afforded to their usage. Persons of ordinary skill in those fields will appreciate that not all contaminants, including those listed below are strictly pathogenic or disease-causing.

SUMMARY

According to certain embodiments of the present disclosure, a contaminant detection system for a portable computer with the computer having a camera, an integral screen and central processing unit (CPU) includes; a. an enclosure having at least one grasping element disposed thereupon sized and shaped mechanically couple the system to the exterior of the portable computer; b. a light emitter capable of generating light of with least one excitation wavelength for a specific contaminant present in its output spectrum with output of the emitter oriented into the field of view of the camera; c. electronic communication between the computer and the emitter; c. software loaded onto the computer capable of (1) activating the emitter, (2) comparing a scene recorded by the camera to at least one emission wavelength for the specific contaminant corresponding to the excitation wavelength, and (3) displaying an output on the computer's screen corresponding to the areas within the camera's field of view where excitation wavelength is present in amounts greater than a detection threshold.

According to further embodiments of the present disclosure, the camera is distinct from the computer.

According to further embodiments of the present disclosure, the software displays upon the screen a continuously updated view of a portion of the camera's field of view with the areas where the excitation wavelength is detected in amounts greater than the emission threshold highlighted relative to the remainder of the camera's field of view.

According to further embodiments of the present disclosure, there is a non-contact thermometer aimed into the camera's field of view for simultaneously recording the temperature of the surface being imaged and capable of discerning whether a user has washed his hands with warm water.

According to further embodiments of the present disclosure, the contaminant is one of the following; mucus having an excitation wavelength of 415 nm and emission wavelength of 555 nm, blood having excitation wavelengths of 395, 417, and 435 nm and an absence of emissions at the excitation wavelengths, peanut oil having an excitation wavelength of 360 nm and primary emission wavelength of 428 nm and smaller emission wavelength of 675 nm, peanut skin having an excitation wavelength of 330 nm flattening absorption near 430 nm in place of an emission wavelength, gluten having an excitation wavelength of 1150-1550 nm and emission wavelength of 1200 and 1425 nm, milk having an excitation wavelength from 800-1100 nm and detectable absorption at 930 and 970 nm, spores having an excitation wavelength of 370 nm and a emission wavelength between 450 and 500 nm, pollen having an excitation wavelength of 370 nm and a emission wavelength at 420 nm, 465 nm, and 560 nm, grass pollen having an excitation wavelength of 370 nm and a emission wavelength at 675-680 nm, *Candida* having an excitation wavelength of 460 nm and a emission wavelength of 530, aflatoxin having an excitation wavelength at 370 and emission wavelength at 428, 415, and 450-500 nm, saliva having an excitation wavelength at 282 nm and a emission wavelength at 345-355 nm, dark hair having an excitation wavelength of 290 and 366 nm and emission wavelengths of 434 and 433 nm, light hair having an excitation wavelength of 292 and 378 nm and emission wavelength of 448 and 337 nm, *Apergillus niger* indicative of spoilage having an excitation wavelength of 410 nm and an emission wavelength of 500 nm, and fecal contamination having an excitation wavelength of 420 nm and emission wavelengths of 675 and 635 nm.

According to further embodiments of the present disclosure, the contaminant is one of the following, nail having excitation wavelengths of 294 and 378 nm and emission wavelengths of 355 and 452 nm, outer layer skin having excitation wavelengths of 290 nm and 370 nm and emission wavelengths of 355 and 452 nm, pig skin having excitation wavelengths of 290 and 324 nm and emission wavelengths of 355 and 392 nm, sheep skin having excitation wavelengths of 292 and 370 nm and emission wavelengths of 351 and 453 nm, goat skin having excitation wavelengths of 292 and 370 nm and emission wavelengths of 345 and 450 nm, cow skin having an excitation wavelength of 290 nm and emission wavelength of 343 nm, collagen having an excitation wavelength of 342 nm and emission wavelengths of 392 nm for type 1 collagen and 390 nm for type 2 collagen, human skin having excitation wavelengths of 290 nm and 378 nm and emission wavelengths of 350 and 466 nm, *Pseudomonas* having an excitation wavelength of 405 nm and emission wavelengths of 390 and 455-475 nm.

According to further embodiments of the present disclosure, the enclosure has an optical filter placed in the field of view of the camera, with the optical filter being selected to pass the emission wavelength of the specific contaminant.

According to further embodiments of the present disclosure, the software correlates specific locations and types of contamination within its field of view with specific remediation recommendations which are shown upon the display. For instance, if a user has contamination beneath his fingernails, in the bends of the fingers, etc., the software recommends hand washing procedures that place additional focus on the problem areas.

According to certain embodiments of the present disclosure, a hardware and software system for managing hand hygiene, the system includes; a first enclosure having a central processing unit (CPU), a camera, a camera filter disposed in front of the camera selected to pass a emission wavelength for the specific contaminant, a light emitter selected to generate an excitation wavelength for a given contaminant, a flow sensor selected from one of a microphone, interruptible line of sight sensor, mechanical switch, hall effect sensor, or mechanical flow sensor, and a feedback device selected from one of a screen, LED, speaker, or buzzer, wherein the CPU has software residing thereupon configured to perform the steps of (1) reading the output of the flow sensor to detect nearby air or fluid flow and upon such detection, (2) activating the emitter and (3) analyzing the output of the camera for the presence of light emissions corresponding to the specific contaminant beyond a detection threshold, and (4) activating the feedback device to communicate the result of the analysis step to a user.

According to further embodiments of the present disclosure, after the reading step, the CPU activates the feedback device to communicate to the user that a scan must be performed.

According to further embodiments of the present disclosure, there is an identification device selected from one of a wireless beacon, NFC tag, RFID tag, BLE tag, Bluetooth device, barcode, or other device readable by the CPU presented by the user with which the CPU can correlate the results of the analyzing step to the identity of the user.

According to further embodiments of the present disclosure, the system has a non-contact thermometer directed into the field of view of the camera and in electronic communication with the CPU, whereby an additional element of the analyzing step is measuring the temperature of the surface or object being imaged.

According to further embodiments of the present disclosure, after the analyzing step, the feedback device is used to provide guidance to the user based on the nature and location of the contaminant found in the analyzing step.

According to further embodiments of the present disclosure, the data from the analyzing step is communicated to a third party server which rates businesses.

According to further embodiments of the present disclosure, the detected fluid flow is in a nearby toilet, sink, towel dispenser, hand dryer, soap dispenser, or disinfectant dispenser.

According to further embodiments of the present disclosure, the feedback device is disposed in a separate room from the camera.

According to further embodiments of the present disclosure, the software process is initiated by a change in state of a proximity sensor.

According to certain embodiments of the present disclosure, a hand drying and contaminant detection system is disclosed, the system including; a digital camera, a light emitter having an output corresponding to the excitation wavelength for a specific contaminant, a drying apparatus selected from one of a towel dispenser or air blower, a feedback device selected from one of a screen, indicator light, speaker, or buzzer, a central processing unit (CPU) in communication with the camera, emitter, and feedback device, and an enclosure within which the aforementioned components are mounted; with the CPU having software residing thereupon which (a) activates the emitter to illuminate a user's hands, (b) evaluates the scene recorded by the camera to determine whether the amount of the emission wavelength for the specific contaminant exceeds a predetermined threshold, and (c) signaling the feedback device to communicate the result of its evaluation to the user.

According to further embodiments of the present disclosure, the drying apparatus is in electronic communication with the CPU such that the process of activating, evaluating, and signaling is initiated by interaction of the user with the drying apparatus.

According to further embodiments of the present disclosure, there is an identification device selected from one of a RFID receiver, Bluetooth receiver, BLE receiver, barcode scanner, or the system's camera in communication with the CPU to perform the additional step of pairing the result of the evaluating step with a user's identity as determined by the identification device reading the value a corresponding identification tag provided by the user.

BRIEF DESCRIPTION OF THE DRAWINGS

The present disclosure will be more readily understood from a detailed description of some example embodiments taken in conjunction with the following figures.

DETAILED DESCRIPTION

Figure 1:
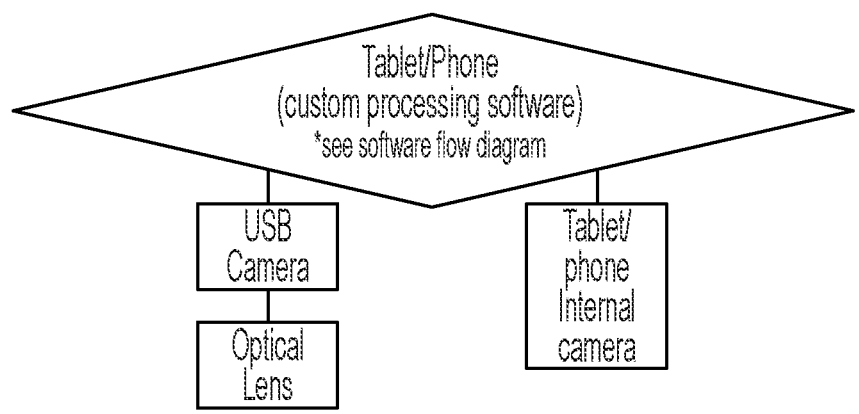
FIG. 1 depicts an example of a camera feature of a computing system according to one embodiment.

Various non-limiting embodiments of the present disclosure will now be described to provide an overall understanding of the principles of the structure, function, and use of the proficiency tracking systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of systems and methods for determining contamination in the form of fecal matter as an indicator of foodborne illness and pathogenic bacteria. Example systems can include incorporation of a mobile device, a software based algorithm incorporating specific wavelengths and excitation levels for detecting the contamination, and a hardware system that can incorporate those elements. The mobile device can integrate with the hardware system to accomplish the detection and conveying of contamination to the user.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments described herein can indicates the presence of pathogenic bacteria by using visible light fluorescent spectroscopy to detect multiple enzymes native to the human gastrointestinal tract. These function effectively as an indicator because the four most common types of bacteria causing foodborne illness (*Salmonella*, norovirus, *Campylobacter*, and *E coli*) are all spread through fecal contamination. In detecting fecal contamination, example embodiments can decrease the spread of these pathogenic bacteria. Such systems can be used to streamline employee sanitation in the workplace and be used as a part of quality control in evaluating the health and safety regulation compliance of an establishment. Additionally, or alternatively, this device could be used to prevent the spread of illness in other locations and use cases: for example schools, emergency response vehicles, cafeterias, grocery stores, nursing homes, hospitals, or anywhere that contamination is possible by an individual or group of individuals not properly washing their hands.

A hardware and software based contamination detection computer system can execute software for the device, as described in more detail below. The mobile based tablet, phone, or computer system can run on any suitable computing system, such as a dedicated server, a user computer or server, multiple computers, a collection of networked computers, a cloud-based computer system, a web-based computer system, or from a storage device, for example. One or multiple processing units, such as central processing units and/or graphics processing units, may perform instructions stored in memory to execute the processes described herein.

A hardware and software based contamination detection computer system in accordance with the present disclosure can be accessed via any suitable technique, such as a web-browser such as SAFARI, OPERA, GOOGLE CHROME, INTERNET EXPLORER, or the like executing on a client device. In some embodiments, the systems and methods described herein can be a web-based application, mobile-based application, or a stand-alone executable. Additionally, in some embodiments, the systems and methods described herein can integrate with various types of mobile systems, such as Android, IOS, web based applications, and the like. Any suitable client device can be used to access, or execute, the computing system, such as laptop computers, desktop computers, smart phones, tablet computers, gaming system, and the like.

Interaction with the tablet or device may include, without limitation, keyboard entry, writing from pen, stylus, finger, or the like, with a computer mouse, or other forms of input (voice recognition, fingerprint recognition, motion sensor recognition etc.). The user interface for showing contamination may be presented on a tablet, desktop, phone, board, external screen, or paper. In one embodiment, the user may interact with a tablet by writing with a smart pen on normal paper, modified paper, or a hard flat surface of their preference. In this embodiment, the user may receive real-time feedback, or at least near real-time feedback, or may synchronize with a backend database and computer system at a later date. The computer system can be a personal computer, one or multiple computers in server-type system.

User interaction with the detection system may take place in any of a variety of operational environments, such as a work setting or a home setting, with one or more users interacting with the system at a given time.

Figure 2:
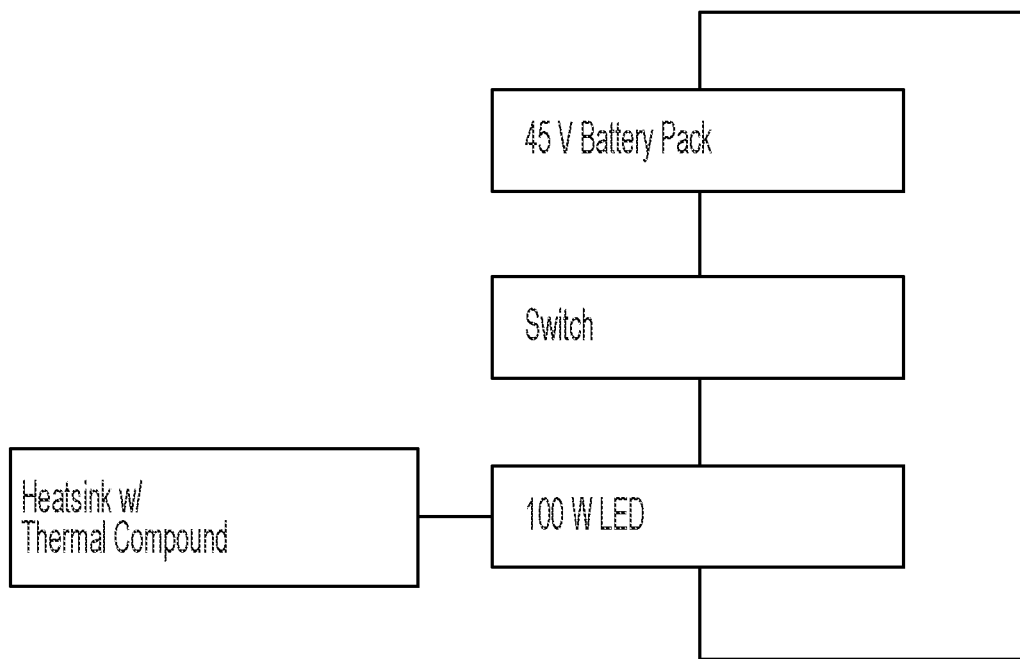
FIG. 2 depicts an example of a light feature of a computing system according to one embodiment.
Figure 3:
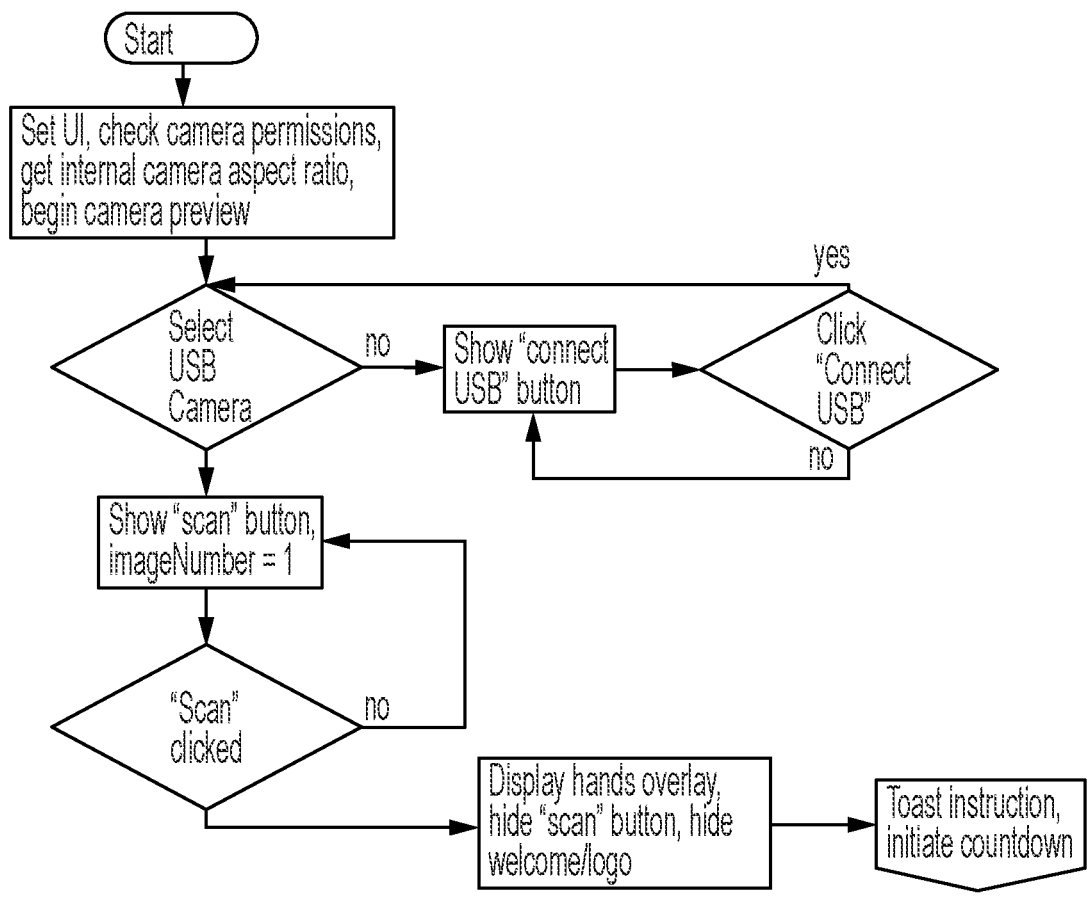
FIGS. 3-6 depict example software interface flow diagrams that can integrate with a hardware system.

The device detects for contamination that could lead to foodborne illness using a combination of mobile technology, specifically developed software algorithms, and hardware components related to those algorithms in combination with visible light fluorescent spectroscopy technologies (FIG. 1 and FIG. 2). The user may need only place their hands, surface, or equipment to be scanned beneath the device, go through the series of steps outlined in the user interface, and can immediately receive feedback as to the presence of contamination—a process which can take, for example, 10 seconds. Embodiments of this system and device can operate to encourage restaurants, operations, and individuals to optimize and use the best and most effective measures for evaluating hand washing available through technology, and not using a cheaper option that merely satisfies compliance. Embodiments of this device can be utilized to build on the current protocols within companies to make them more effective. While all companies have sanitization processes in place to protect their customers from harmful bacteria, these routines, no matter how elaborate, still leave room for human error, inconsistencies, and deviation from the set system. With a technology based solution, this device offers the ability to ensure that all are fully complying with standards. For long term feedback system will provide a log of handwashing/analytics that can be used to improve upon and identify best practices.

The example system described in FIG. 1 and FIG. 2 can be further broken down into the following specific components: 1 or more USB cameras, 1-3 100 W LED (specifically with an excitation of 415-420 nm) or a series of lower watt LEDs, Aluminum Heat Sinks to eliminate overheating, thermal Compound Paste for prevention of overheating of the system, batteries to power the system (equivalent to 45 V), a switch or motion detection sensor for starting the system, an optical lens equivalent to a 676 nm bandpass interference filter, a custom printed phone/tablet case for user interface and functionality of creating necessary shade for device specificity, and a tablet/mobile phone (android or IOS) to manage the software components of the system. In some embodiments, the optical lens is attached directly to the mobile/tablet camera and a USB camera is not required as a part of the system. In this instance, the internal mobile/tablet camera in combination with the lens takes the photograph which is then processed by the software algorithm as described. In some other embodiments, instead of a USB camera a CCD camera is used.

In some embodiments, this device could be used with numerous different cases to provide additional or alternative functionality to the user. These alternative functionalities are depicted in FIGS. 12 through 21, with details on the functionality of the cases and the alternative uses they would provide shown above. Some of these examples are integration with a hand dryer, a conveyer belt, a door locking system, handheld usage, or wall mounted systems. These designs also include alternative uses for the hardware components including various amounts and camera placements, various amounts and light source placements, and the orientation of the hardware systems as a whole. In some embodiments, the hardware system connects remotely to the software tablet based system and they can be placed in separate locations or have multiple hardware systems reporting back to the cloud based software component.

A more detailed view of the components of the software functionality on the mobile device that integrate with the specified hardware technology system outlined above is shown in FIGS. 3-7. The flow diagrams described herein may allow the hardware detection tool images to be captured, analyzed, and presented to the user in a way that allows a clear understanding of the result of the scan (contamination detected or not detected) and ability to store the data for future review and presentation.

The flow diagram of the portion of the software that initiates the link between the hardware components and the application (FIG. 3) is outlined above. The software can facilitate the identification of cameras, begin the display of camera previews at the right dimensions to fit within the screen, and initiate the scan process once the appropriate signal is received. The following components outline the example steps indicated on the figure above: As the application starts and the screen comes online, the camera dimensions can be adjusted and a "preview" (what the camera is seeing) can be displayed on the screen (1). To do this, a request to the device may be incorporated to allow the application to access the device camera. Once completed, the User Interface can display as designed and the camera image will not be cropped. This step (2-4) may only be used to allow the user to know what the device can see, so they can properly place the object that will be scanned. It may be replaced by an outline of the scan area drawn on the device or floor, or by narrowing the field of projected light such that the camera can see anything in the light. It does not need to be the internal camera for the device, and can also be done with an external camera. The defining factor of this camera is that it does not have an optical filter. An additional camera with an optical filter (in this case connected by a USB) can now be connected. This can request user input to select which camera is used, and to allow permission for the application to access the camera. Once connected, the device can then scan for contamination. This connection may be done automatically, or through a wireless method. It may be done with more than one camera. This camera or cameras can have optical filters specific to the device wavelength. The user can provide input to initiate the scanning sequence (5-6). In this case it can be through pushing a button on the screen of the device, but it could also be triggering a motion sensor, proximity sensor, or be triggered from a different application through an integration. Once this input is received, the device can prepare to record a new scan and the scanning process will begin. This may be required, in one example, to prevent the device from draining its battery by constantly scanning. Once the scan is initiated, instructions can be provided for the user to guide them through the scanning process. In this example (7-8), a visual guide ("overlay") is displayed to help the user determine where to place their hands. Written instructions are also used in the form of toast notifications. Any combination of written or visual instructions can be used, or a separate "tutorial" section can be designed.

Figure 4:
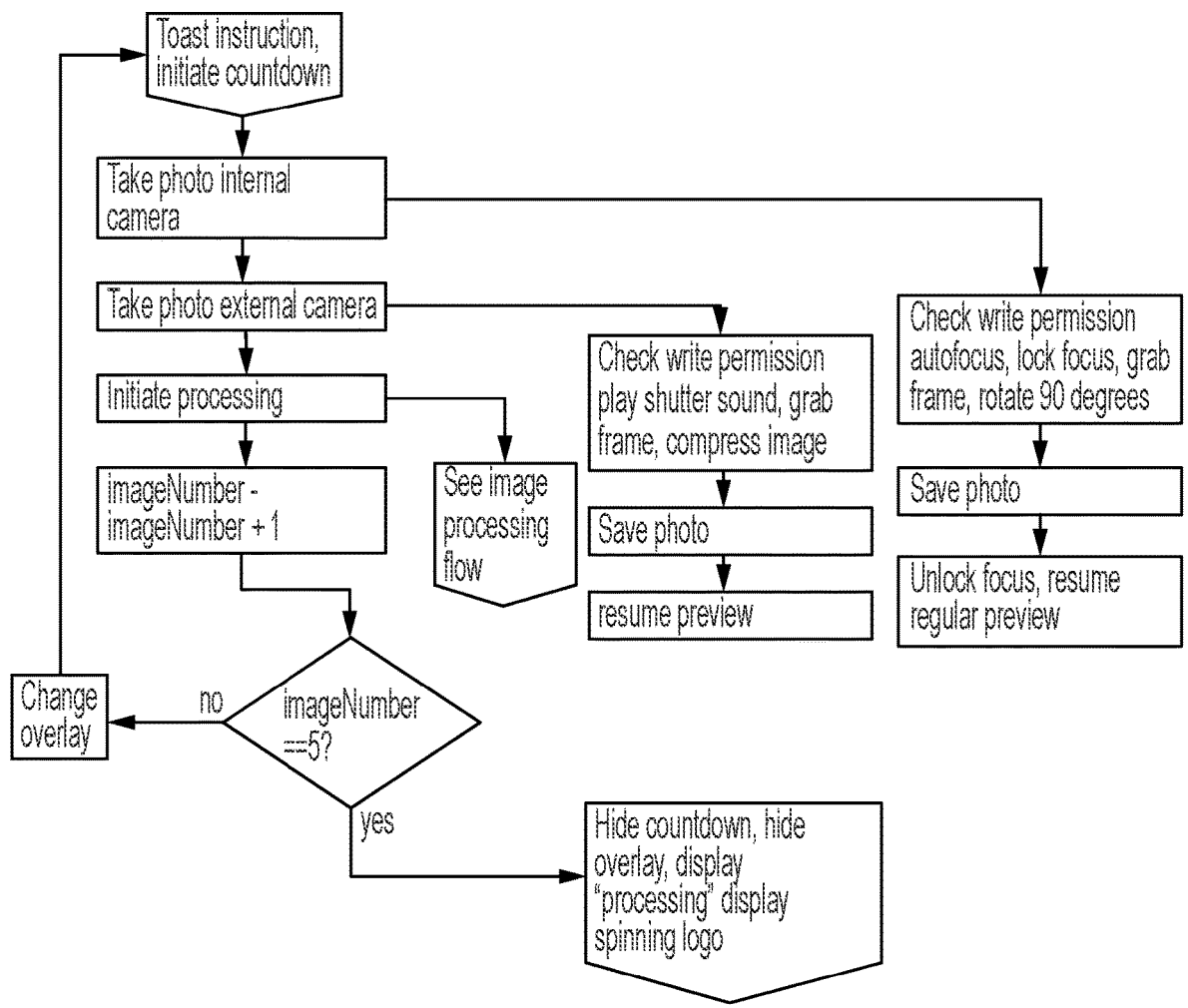

An example flow diagram for the portion of the software that conducts the scan process is shown in FIG. 4. It can first instruct the user how/where to position the object, capture photos at the required times from the connected cameras, save the images, then resume the camera preview. This process can loop until the expected number of photos have been taken. The following components outline the example steps indicated on the figure above: When recording images during the scanning process, photos must be taken near-simultaneously, especially if the images will be overlaid to indicate the location of the contamination. The process (9-16) for an internal hardware camera and an external camera integration is necessary for this overlay to occur. The individual steps may vary depending on the specifics of the camera hardware. A device may use multiple external cameras, and may not use an internal camera. Before the image is saved, write permissions can be requested from the device. After the image is taken, the regular preview screen (if in use) can be immediately resumed. The image and any corresponding relevant information about the scan can be saved at this time. In section (19-20), the example scan proceeds to the next step. Depending on the configuration of the scan, one or more photos can be taken by each camera. In this specific case, images will be taken exactly four times, so this section iterates until the correct number of photos have been taken. This is not necessary if only one photo is taken by each camera, and can be increased/decreased if the number is different than four. If the threshold has not yet been met, then the application will update the graphical and written instructions and prepare for the next set of photos to be taken.

Figure 5:
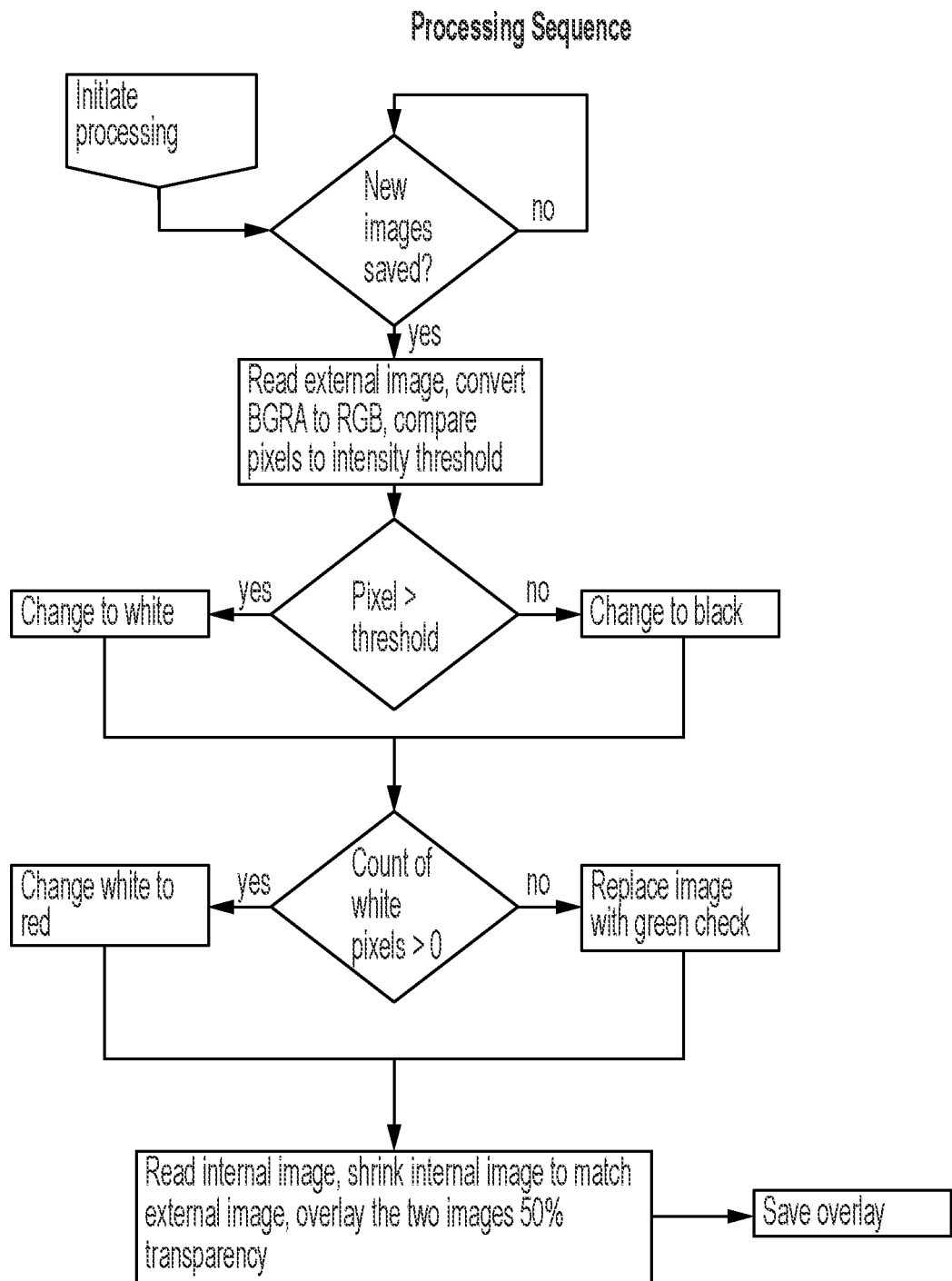

An example flow diagram for the portion of the software that processes the images that have been taken in the scan process is shown in FIG. 5. It can convert the format of the images, compare the pixel intensity values to the threshold, record pixels which are above the threshold, and then determine if the sample has passed or failed the scan, ether on an overall or pixel-by-pixel level. The following components outline the example steps indicated on the figure above: The processing portion (22) of the application can enter a waiting period, ensuring that all expected photos have been successfully saved. Once the application successfully recognizes the images are present, it can proceed with the image processing. This can also be achieved by a delay of adequate length, or through waiting until all images are saved before beginning any processing. This may be required in one example to ensure the correct images are present before processing is attempted. The image (from the camera with the optical filter) can be read by the processing portion (24-26) of the application and can be converted to an appropriate format that it can be compared to a threshold, in this case from BGRA to RGB. The threshold can then be run against each pixel in the image to identify which have brightness levels above the detection threshold. This threshold can be run individually on each channel (Red, Green, Blue) or together as an average. Pixels above and below the threshold can then be marked as such. In this case, they are marked by changing the color of the pixel. The total number of pixels greater than the threshold can then be identified as an indication of if the sample "passed" or "failed" the contamination screening. In this case (27-29), if the total number of pixels above the threshold is above 0 then they are changed to red, so the regions which have failed can be displayed to the user. This threshold may trigger "pass" or "fail" to be indicated as standard images, or as text. Regardless of the method, this step can determine the decision of pass or fail for the image. Once the pass or fail has been determined, the appropriate action (30-31) can be taken to save the result. In this case, a pass results in a green check being overlaid over the secondary non-processed image while a fail results in red regions being overlaid over the secondary non-processed image. The overlay is necessary for the user to be notified of the region of the image that caused the scan to fail. If only a "pass" or "fail" will be reported, then a post-processed" image does not need to be generated and saved.

Figure 6:
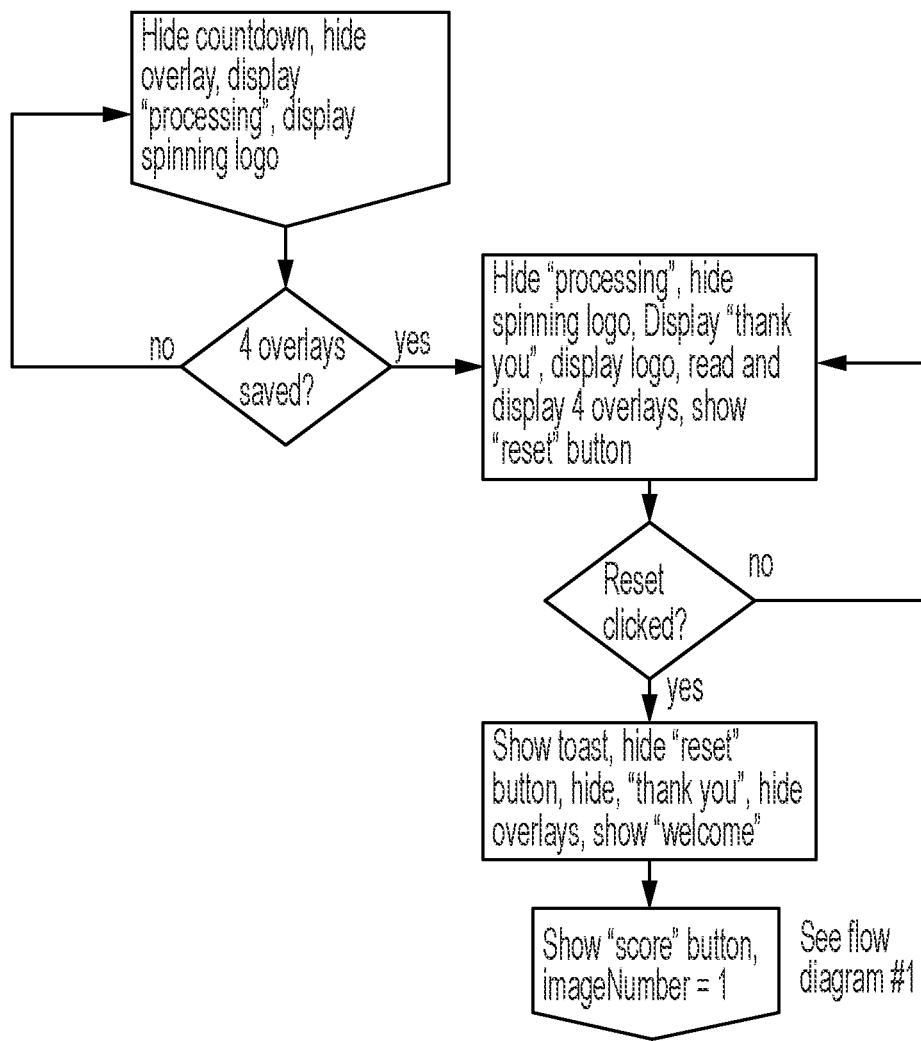

FIG. 6 illustrates the flow diagram for the portion of the example software that displays the results of the scan to the user, and prepares the application to begin a new scan. The following components outline the steps indicated on the figure above: The primary portion of the application can wait until all expected images have been processed and results have been recorded. Once the application successfully recognizes the results are present, it can proceed (32) with the result display process. This can also be achieved by a delay of adequate length. This may be required, in one embodiment, to ensure the corresponding decisions are available before result display is attempted. During this waiting period, a "processing" image or text can be displayed to the user. Once all decisions are available, the application can report them (33) to the user. This can be through one single collective "pass"/"fail" or through individual results from each of the images taken. In this case, four results are displayed corresponding to the four images recorded. This is how the immediate user is informed of the test results. Other solutions might include text messaging, e-mail, or audible indication of results. While the results are being displayed to the user, there is also an ability for the application to reset and prepare for a new scan. In this scenario (35), the reset can be triggered by a button on the screen pressed by the user. It can also be triggered by a timer, a period of time without triggering a motion/proximity sensor, or be immediately ready for a new scan with the results recorded for future viewing. This may be required, in one example, to allow the device to prepare for a new scan.

Figure 7:
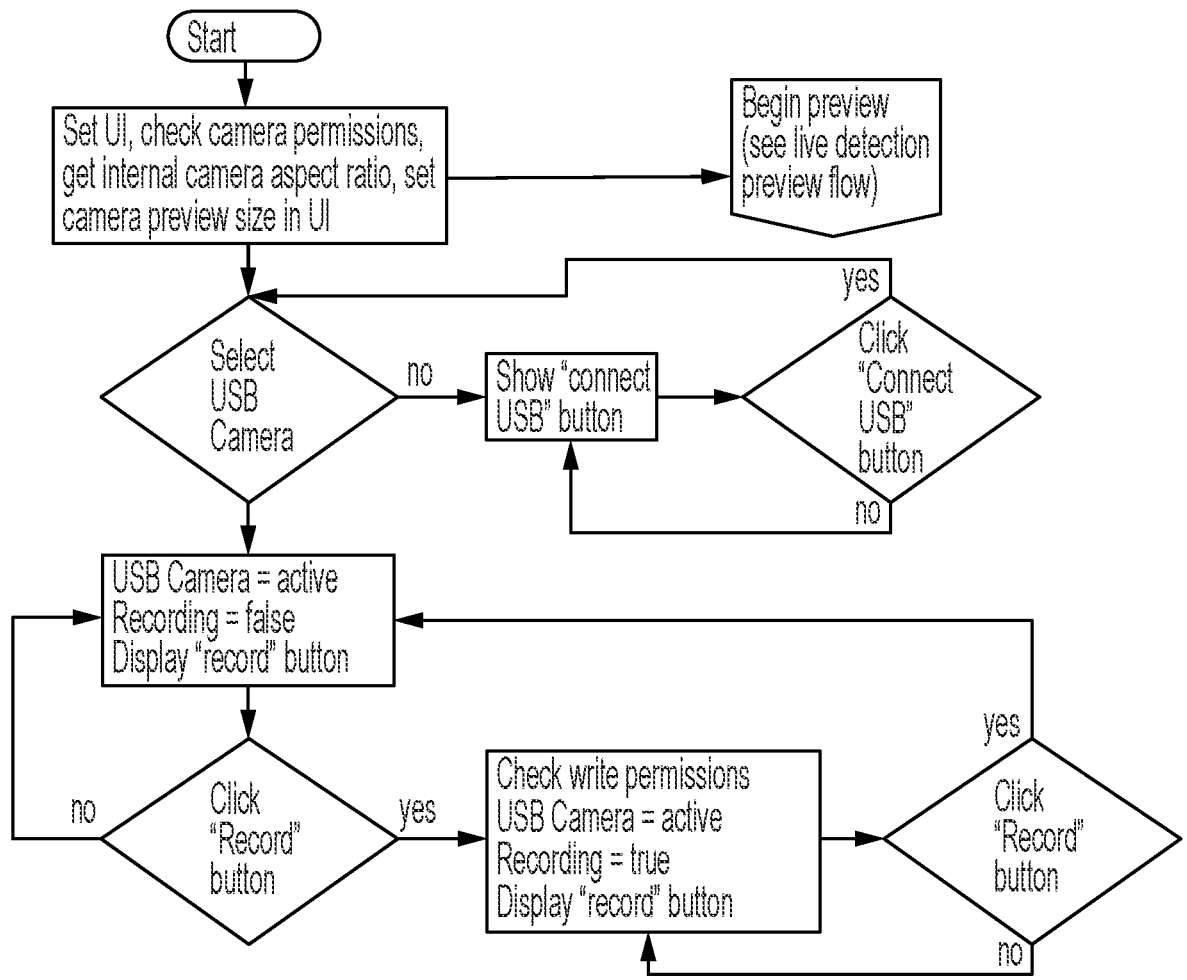
FIGS. 7-8 depict example flow diagrams associated with technology to automatically display live video preview and recording.
Figure 8:
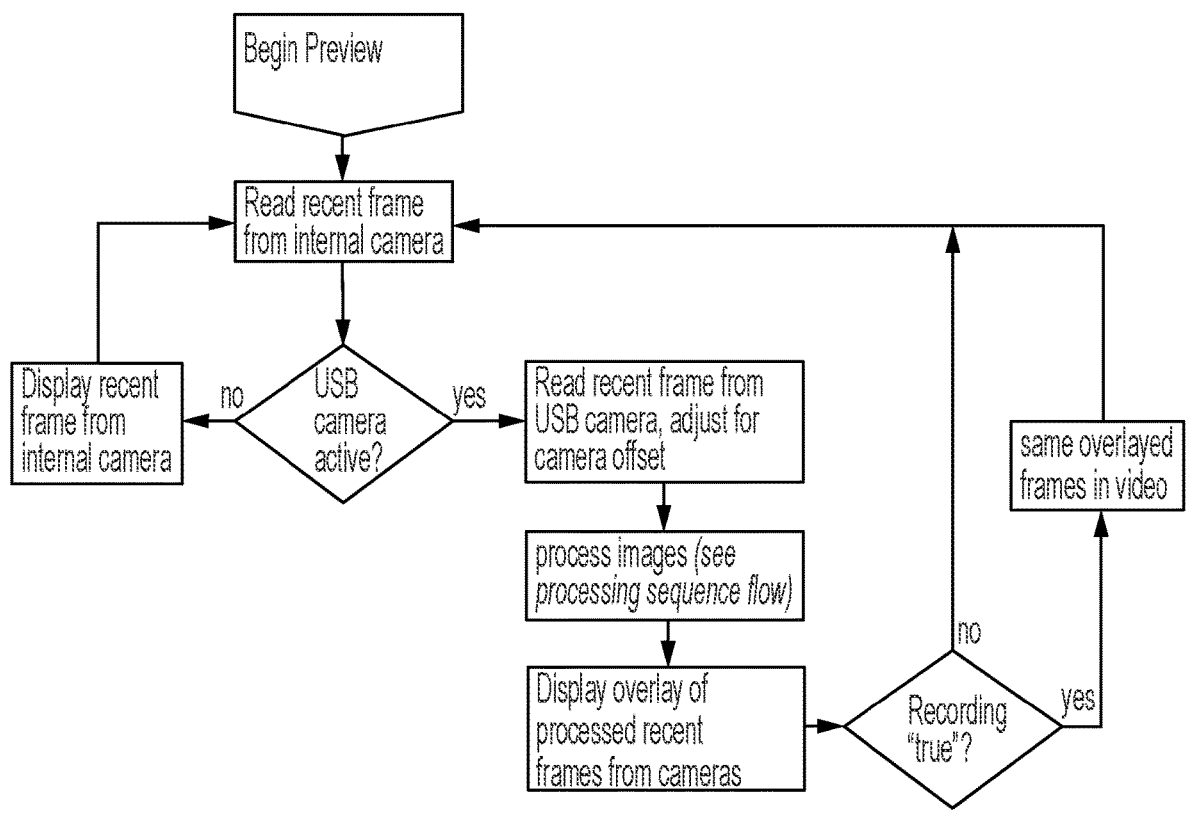

In some embodiments, the software could be configured to show detection in real time without processing and reporting back to the user. FIG. 7 is a flow diagram representing an example process where the software allows the user to record each frame from the camera consecutively as a video. Combined with the flow diagram below, it can record contamination as seen in real time or substantially real time. FIG. 8 is a flow diagram which shows the processing performed on each frame of the camera preview immediately before it is displayed, according to one embodiment, resulting in a live preview showing contamination. When combined with input from FIG. 7, it can also save each of the frames into a video.

Figure 9:
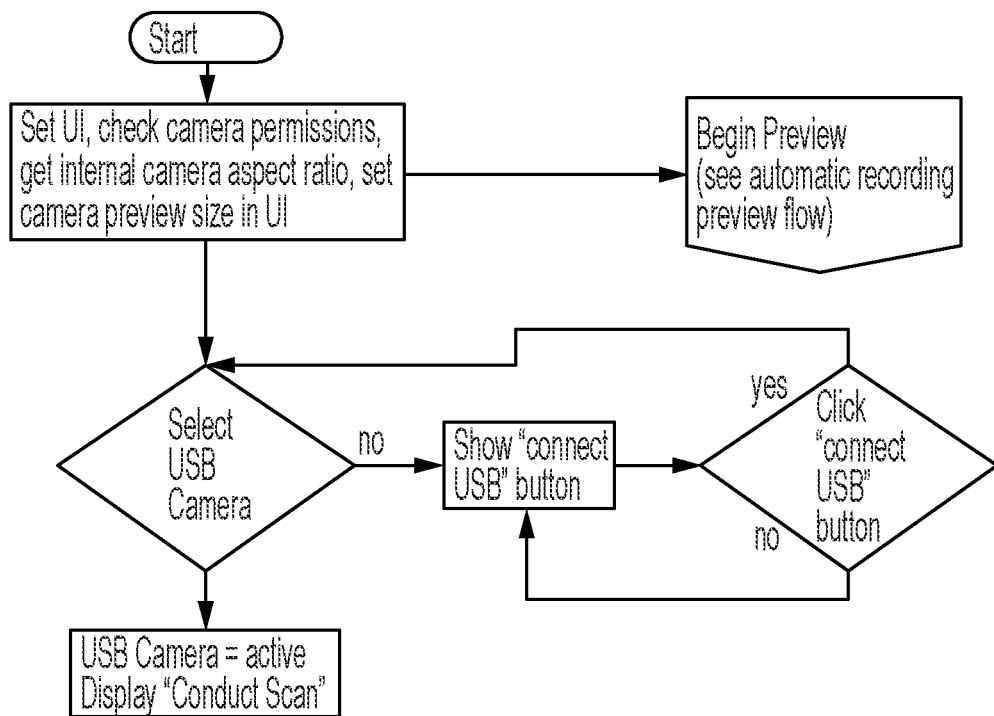
FIGS. 9-11 depict embodiments associated with automatically capturing and storing images of a specific threshold.
Figure 10:
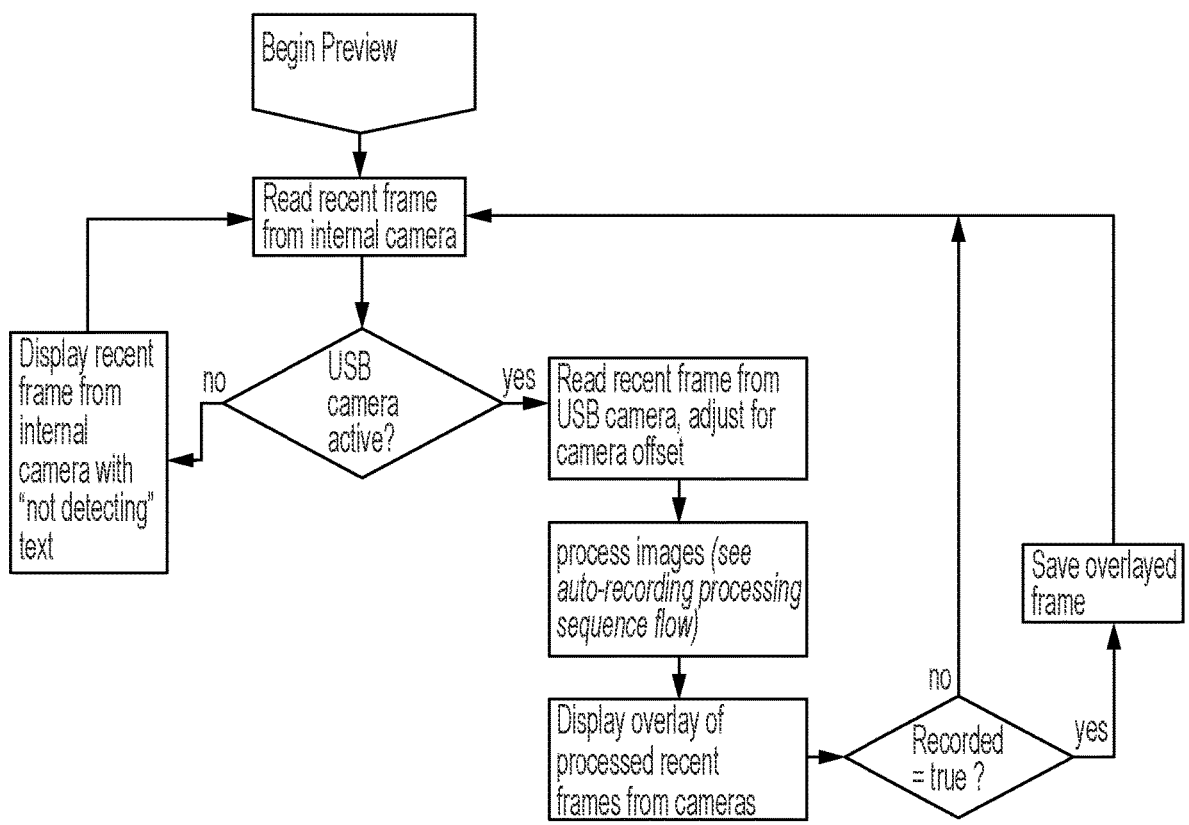
Figure 11:
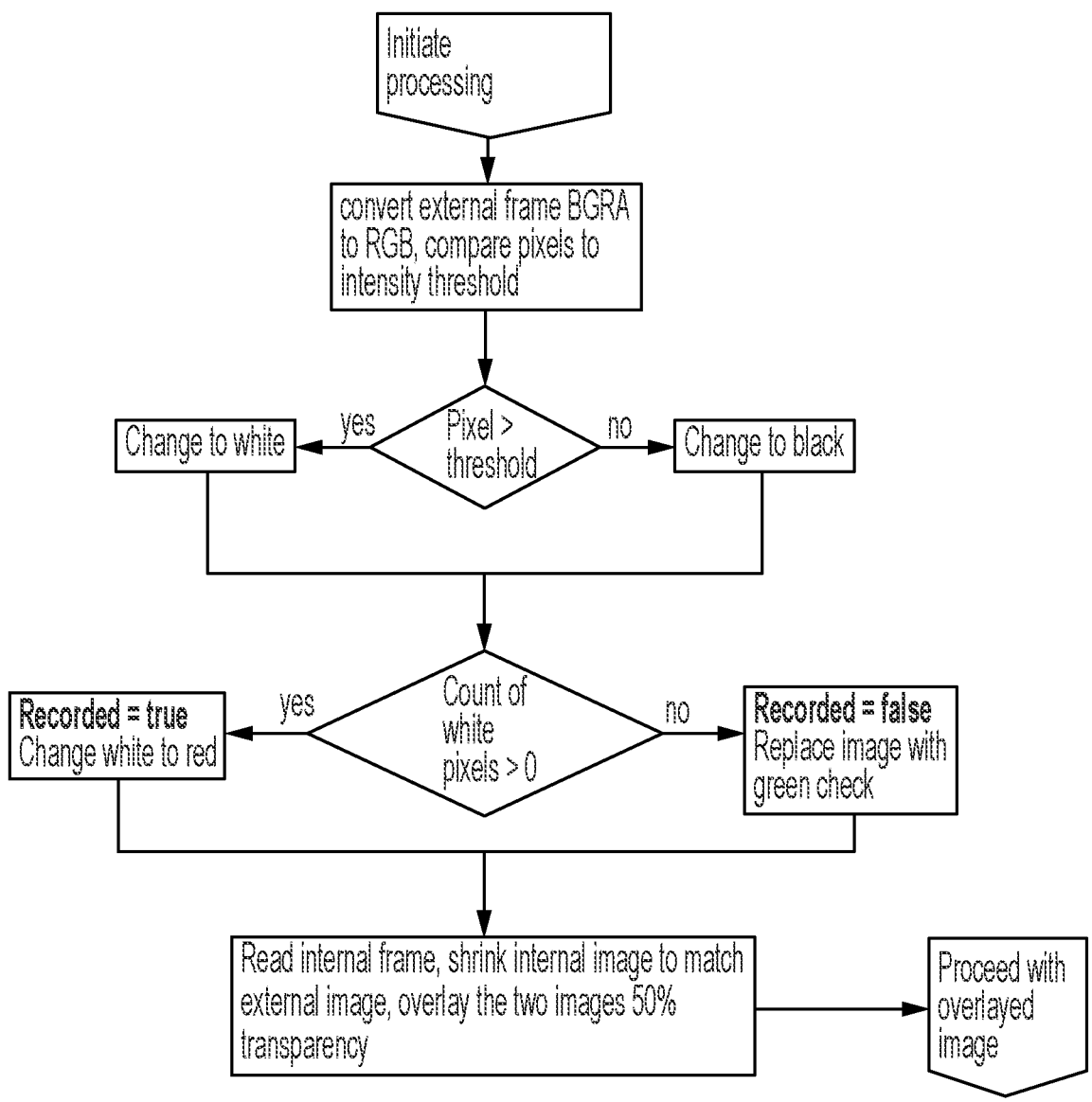
Figure 12:
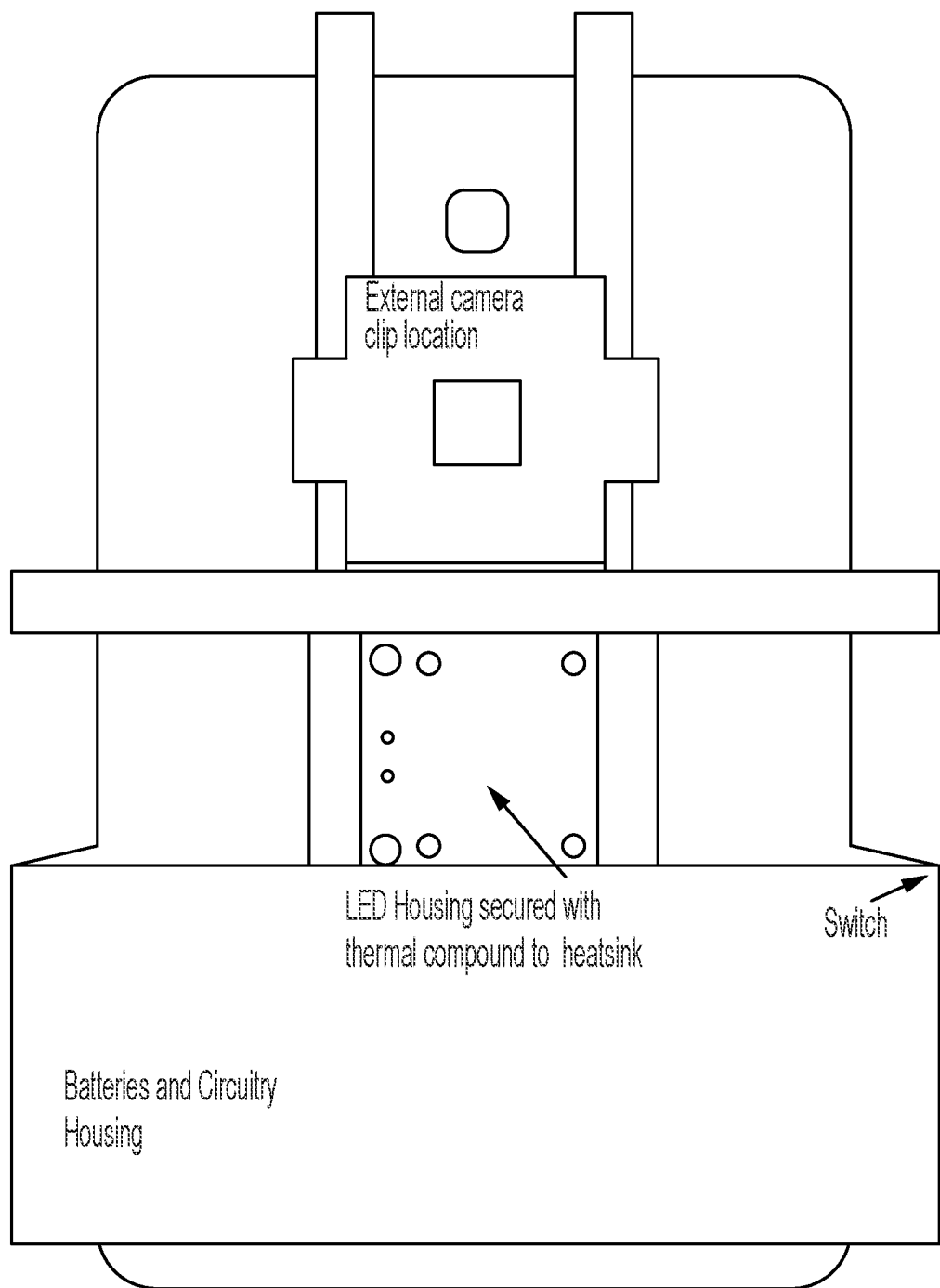
FIG. 12 depicts a hardware snap-on device according to one embodiment.
Figure 13:
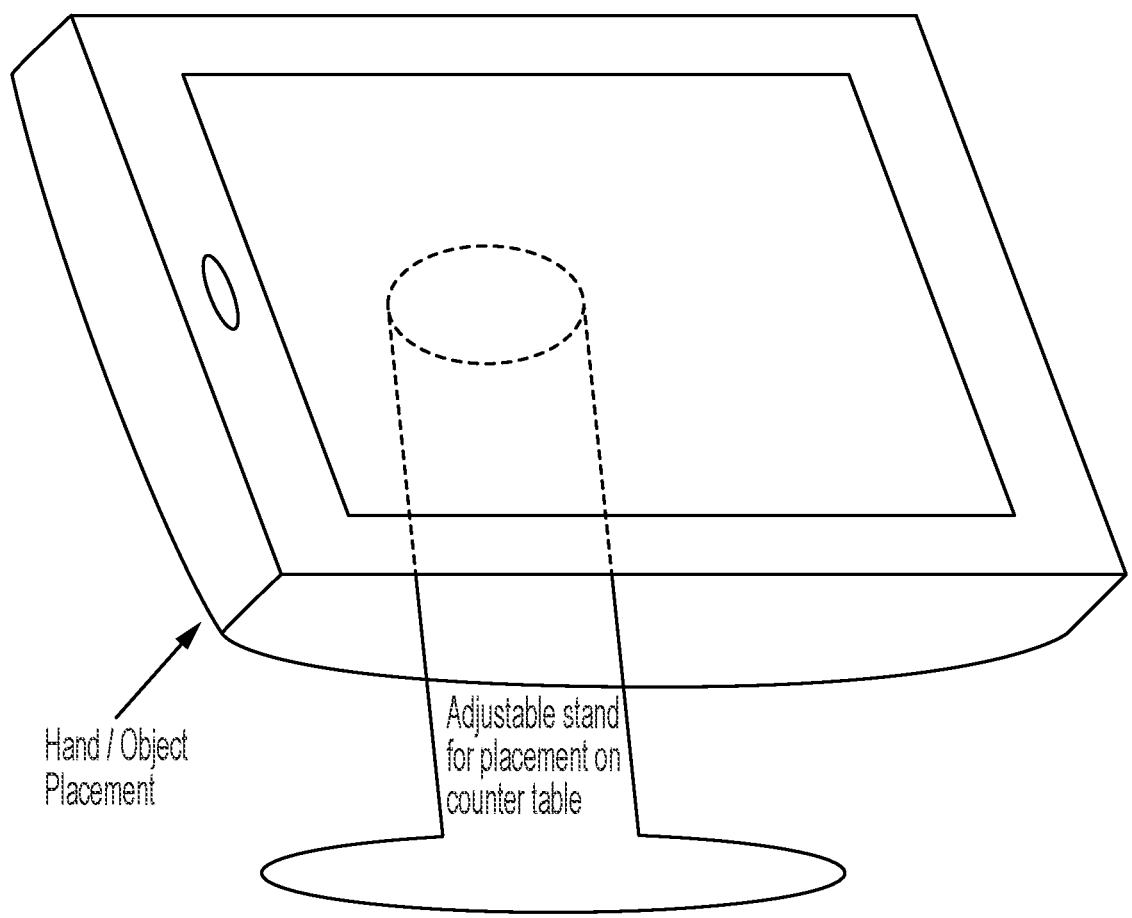
FIG. 13 depicts an adjustable stand for the device according to one embodiment.
Figure 14:
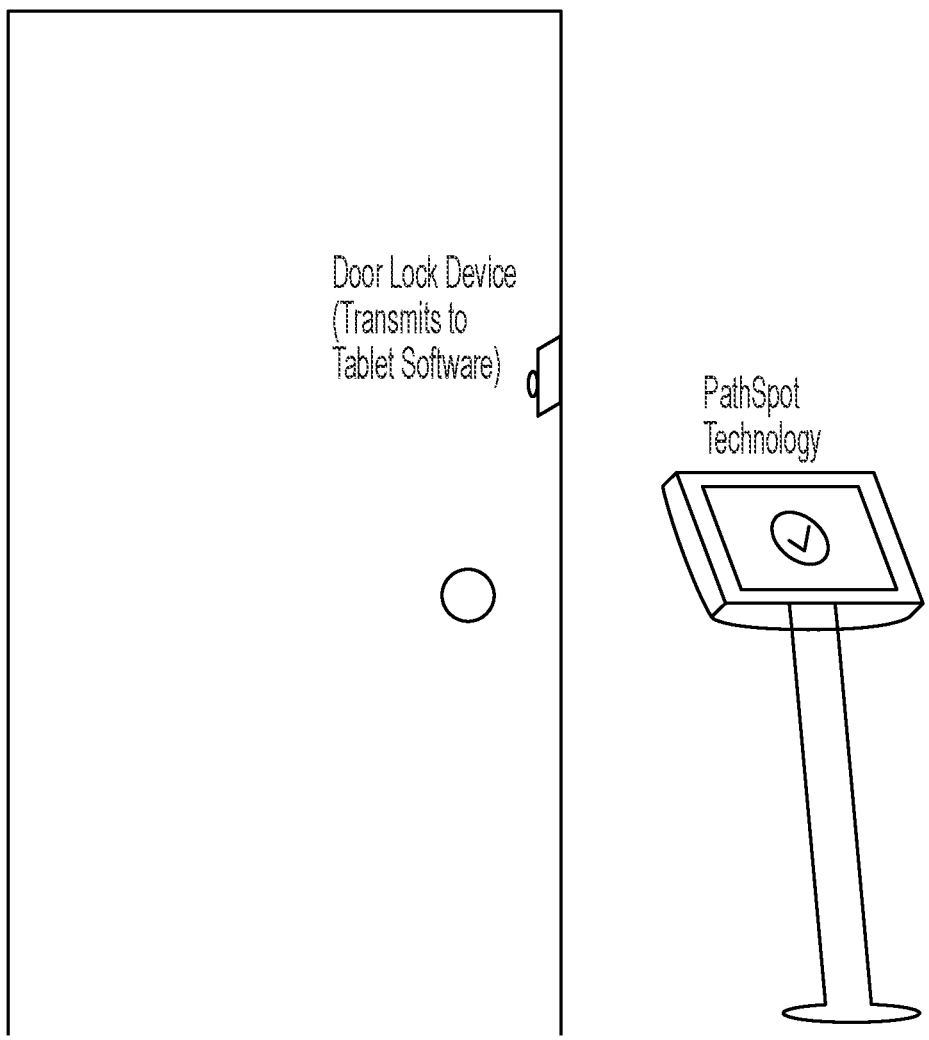
FIG. 14 depicts a door locking device that can open when an individual successfully indicates clean hands according to one embodiment.
Figure 15:
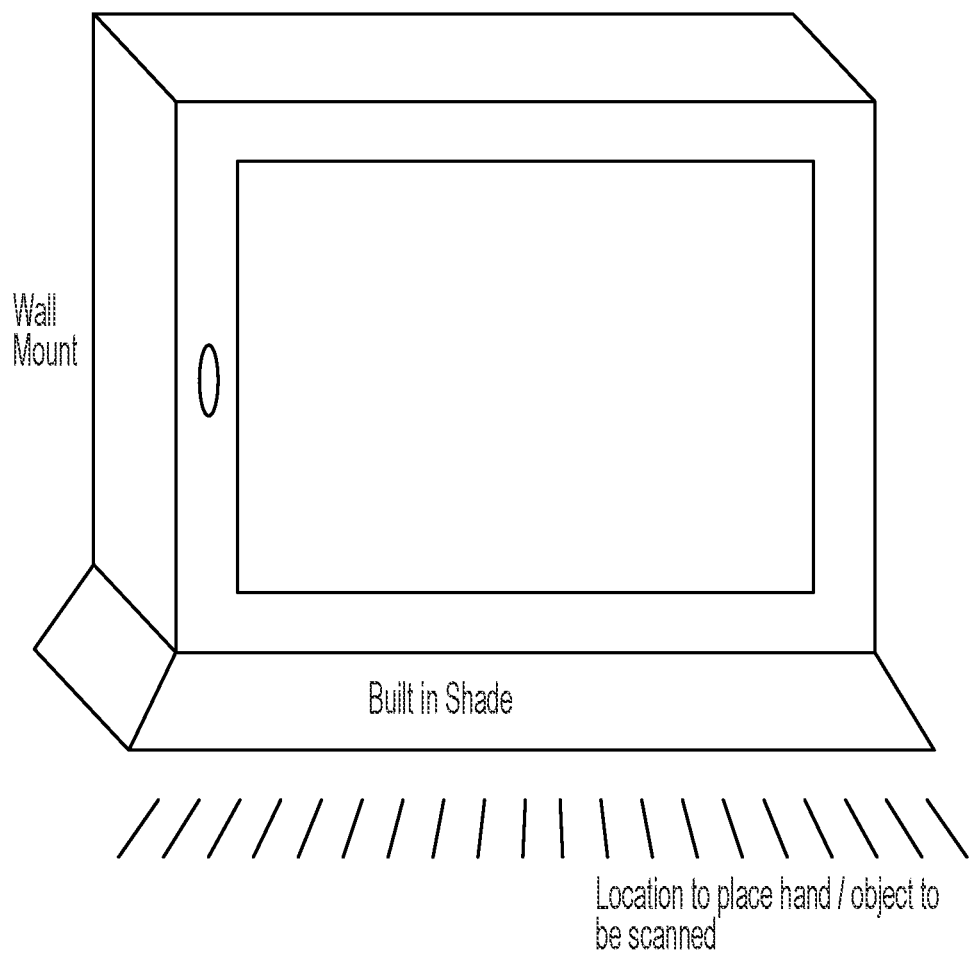
FIG. 15 depicts a wall mounted device according to one embodiment that can help ensure appropriate items are placed underneath the device (e.g., hands, equipment, etc.) and have not been contaminated
Figure 16:
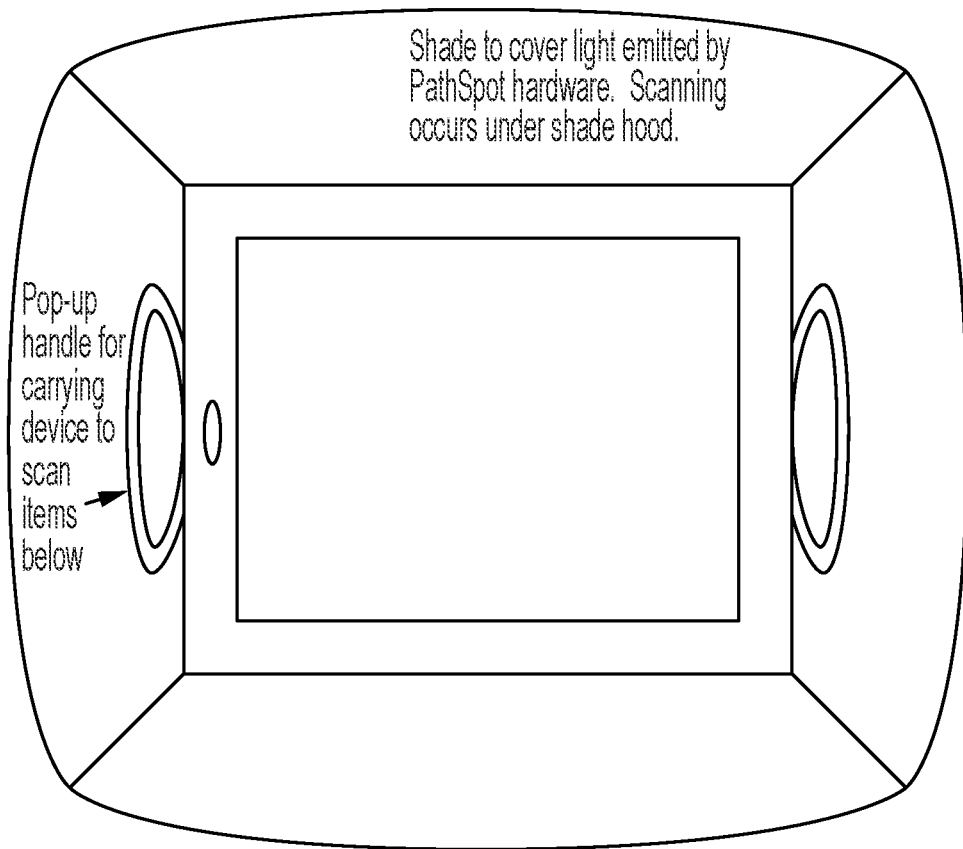
FIG. 16 depicts a shaded device with handles for portable usage and detection according to one embodiment.
Figure 17:
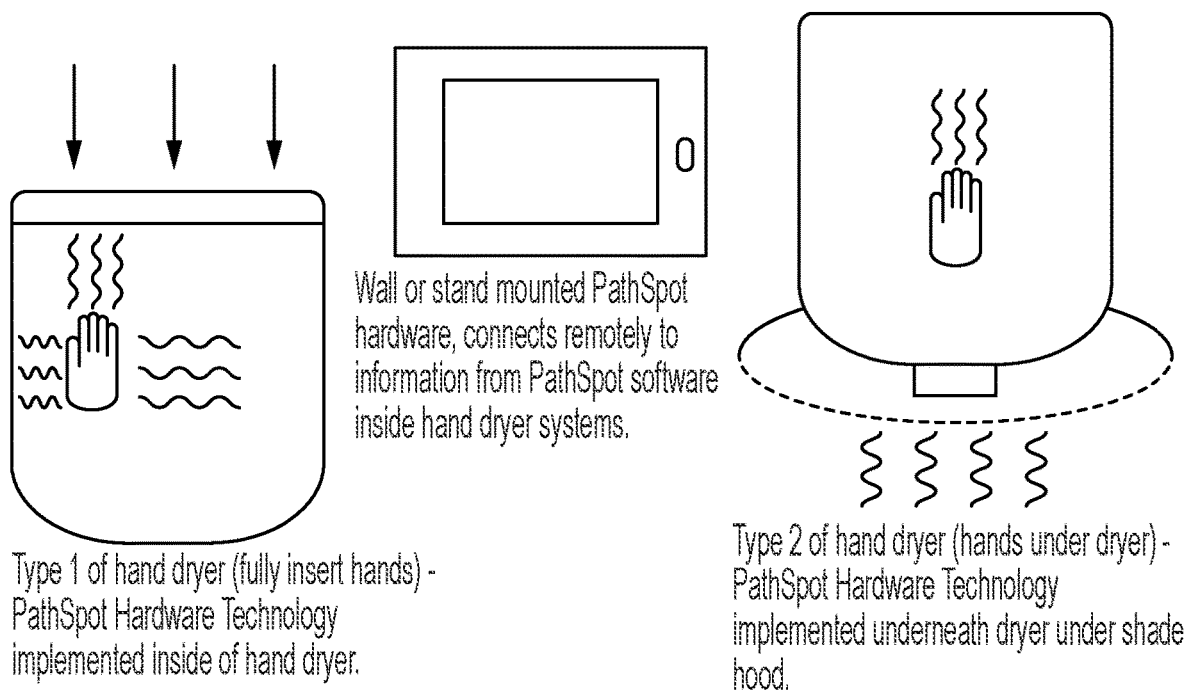
FIG. 17 depicts a device which integrates with currently used hand drying systems according to one embodiment.
Figure 18:
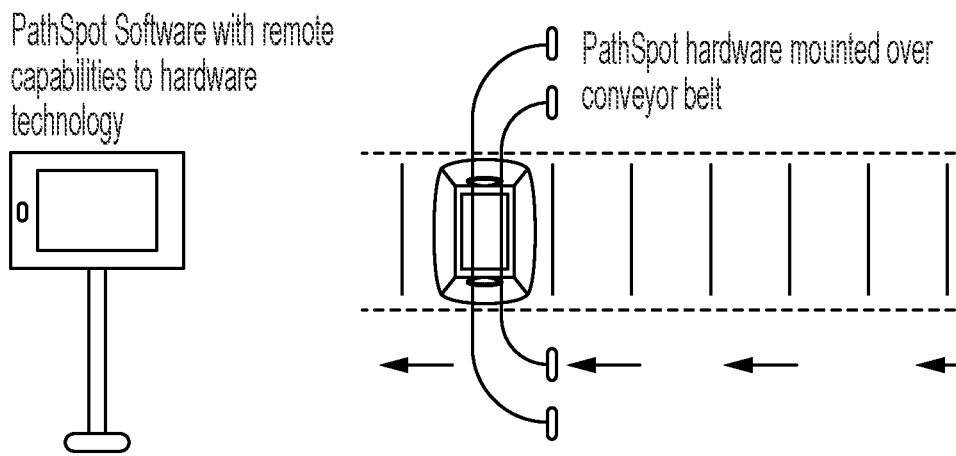
FIG. 18 depicts a casing which can work as an overlay to a conveyer belt or system according to one embodiment.
Figure 19:
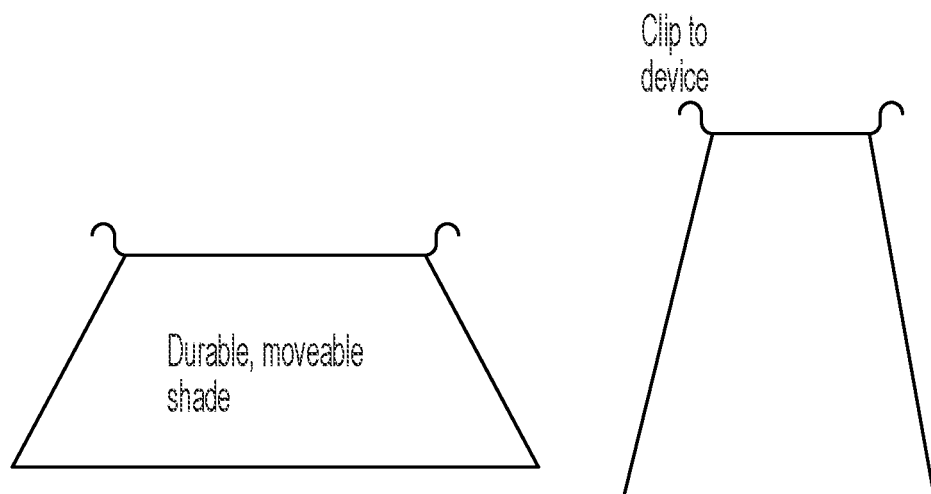
FIG. 19 depicts a set of shades that can be attached or removed from any case or system design to increase specificity according to one embodiment.
Figure 20:
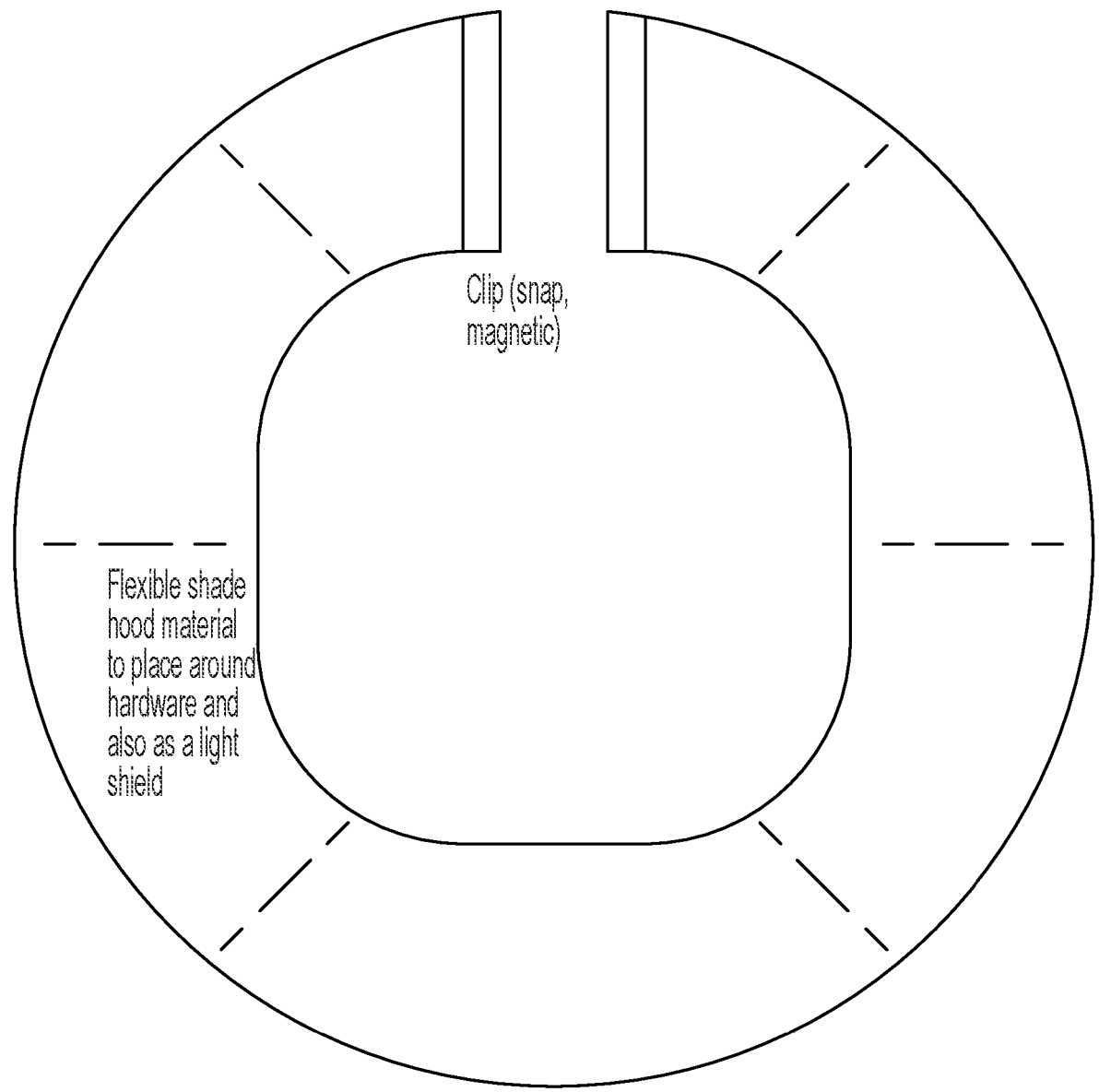
FIG. 20 depicts an alternative casing design with a clip on shade to increase specificity when necessary.
Figure 21:
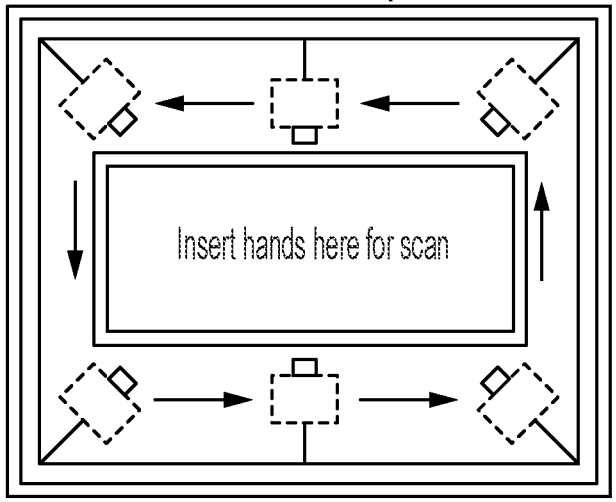
FIG. 21 depicts a system with one or a plurality of cameras that can rotate in combination with a slot that can allow for the ability to insert objects (e.g., hands or a device) for detection of contamination from a plurality of angles.
Figure 21:
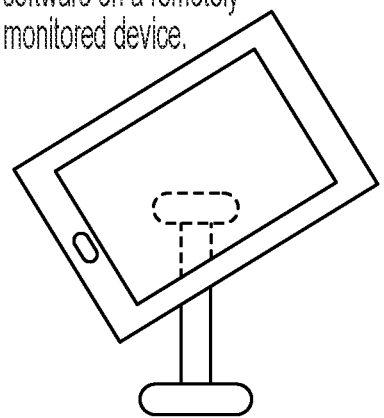

In some embodiments, the software could be configured to have automatic capture of images above a certain threshold. FIG. 9 is a flow diagram which shows the initiation of the link between the hardware components and the application, similar to FIG. 3. As soon as the USB camera is identified, then the processing can begin and the auto-recording can take place. FIG. 10 and FIG. 11 are flow diagrams representing the ability to enable the auto-recording of images during a scan. Each preview frame from the camera can be processed and "failed" images will be saved automatically. FIG. 10 includes the preview display and image saving sections of that functionality. FIG. 11 includes the image frame processing and thresholding that determine which pixels contain contamination and which images should be recorded.

Figure 22:
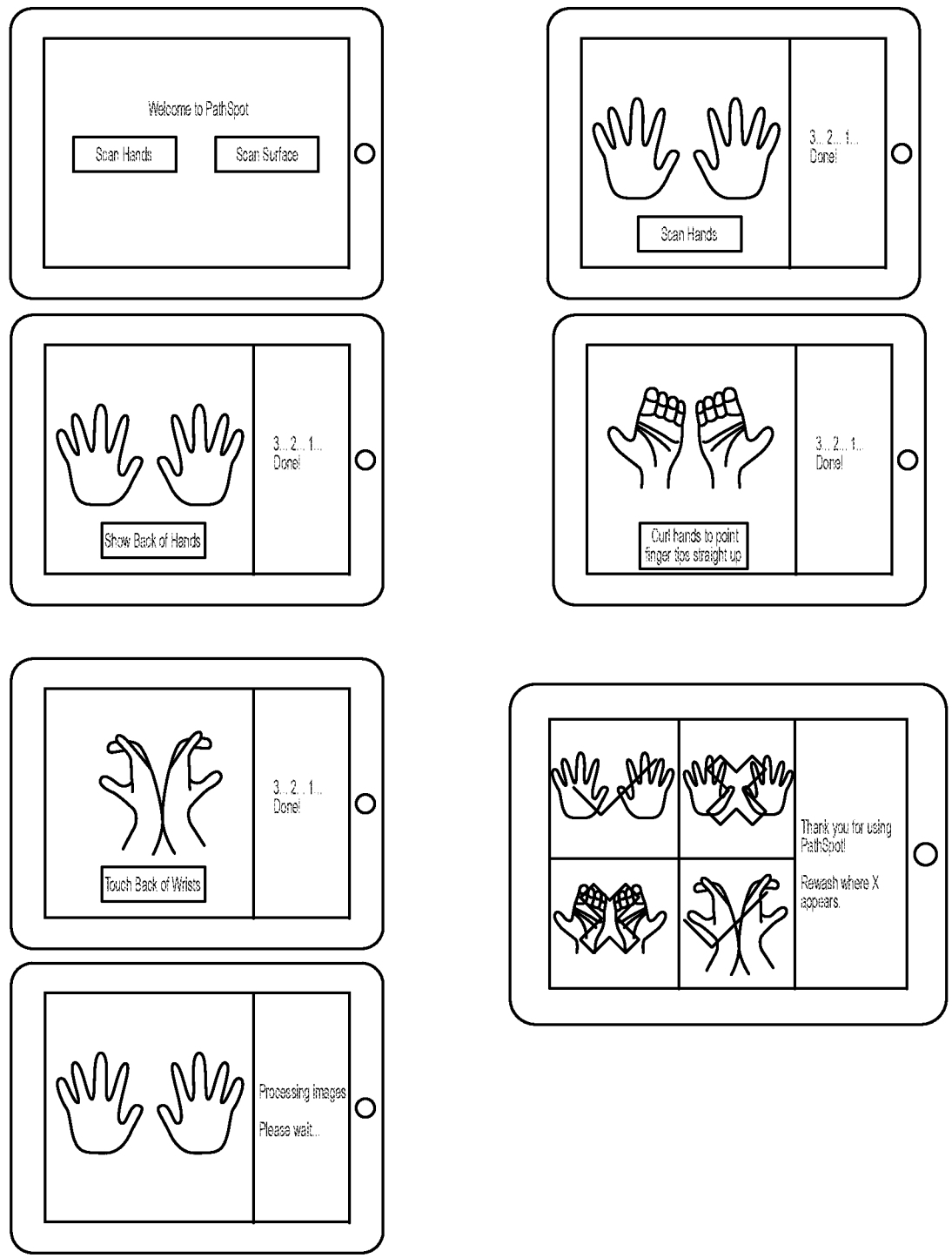
FIG. 22 depicts an example user interface flow.

FIG. 22 indicates a sample of the user's ability to interact with the device. In this flow, a user would indicate if they were scanning a surface or a hand, and would place the surface or hand underneath the device at varying angles to ensure all detection was accomplished. After processing in less than 10 seconds, the images would display overlaid with a red "X" or green check mark indicating if the user needed to rewash or had sufficiently avoided contamination. This is one example of a simple user interface, but could be adjusted based on different use cases or installation of the device in different locations.

Figure 23:
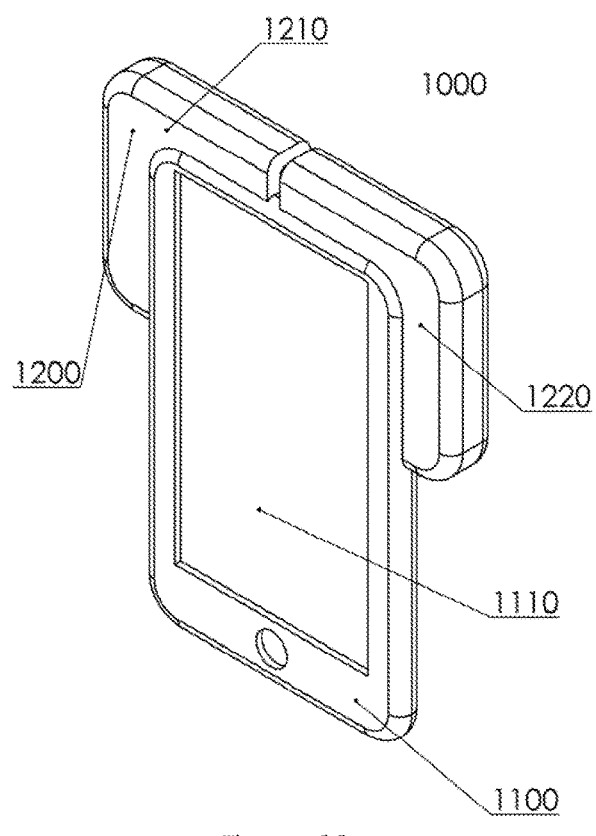
FIG. 23 depicts a perspective view of a pathogen detection system coupled to a portable computer.

Referring now to FIGS. 23, 24, 25, and 26 together a pathogen detection system 1000 is shown having a portable computer 1100 removably coupled to a pathogen detection module 1200. Portable computer 1100 has a screen 1110 on a first face thereof and a camera 1120 on a second face thereof. There is a CPU disposed within the portable computer running an operating system and providing connectivity between its associated components. Examples of portable computers include tablets and telephones such as Apple Iphone® and Apple Ipad® devices. Pathogen detection module 1200 is a body having a left portion 1210 and a right portion 1220. There is a set of slides 1230(*a* and *b*) coupling the left and right portions such that the distance therebetween is adjustable. According to certain embodiments of the present disclosure, slides 1230(*a* and *b*) are tubes friction fit into complementary apertures in the left and right portions such that a used may adjust the distance between the left and right portions by urging the portions towards or away from one another. There are respective recesses 1221 and 1211 formed into right portion 1220 and left portion 1210, with the recesses being sized and shaped to engage the profile of the portable computer so that when the portions are urged against a portable computer as shown in FIG. 23, they firmly grasp the computer therebetween.

Pathogen detection module 1200 includes an aperture 1205 which affords camera 1120 a view of the scene beyond the module 1200. According to certain embodiments of the present disclosure, aperture 1210 includes an optical filter disposed between camera 1120 and the scene, with the filter being chosen to selectively pass via band-pass, high-pass, or low-pass the detection (emission) wavelength of the target chosen pathogen or contaminant. There is a bank of LEDs 1222 disposed upon a face of right portion 1220, with the LEDs having an output including the excitation wavelength for a chosen pathogen or contaminant. LEDs are in electronic communication with the portable computer, such that software operating on the computer can turn the LEDs on and off as needed for a scan.

Figure 24:
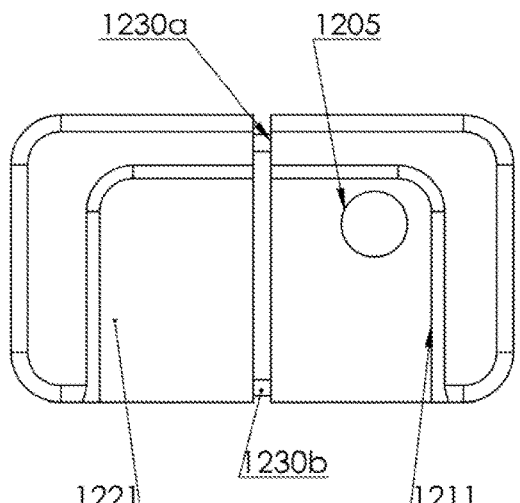
FIG. 24 depicts a front view of the pathogen detection system of FIG. 23 with the portable computer removed.
Figure 25:
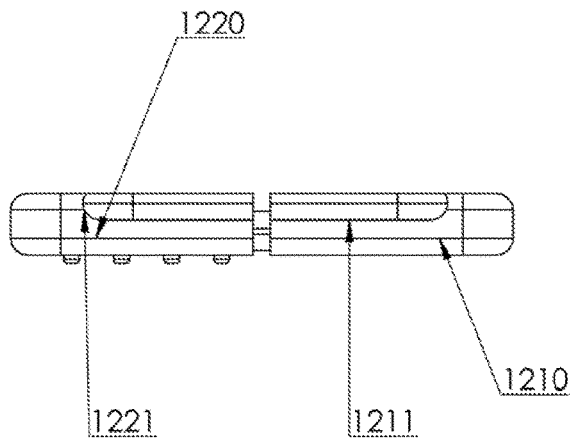
FIG. 25 depicts a bottom view of the pathogen detection system of FIG. 23 with the portable computer removed.
Figure 26:
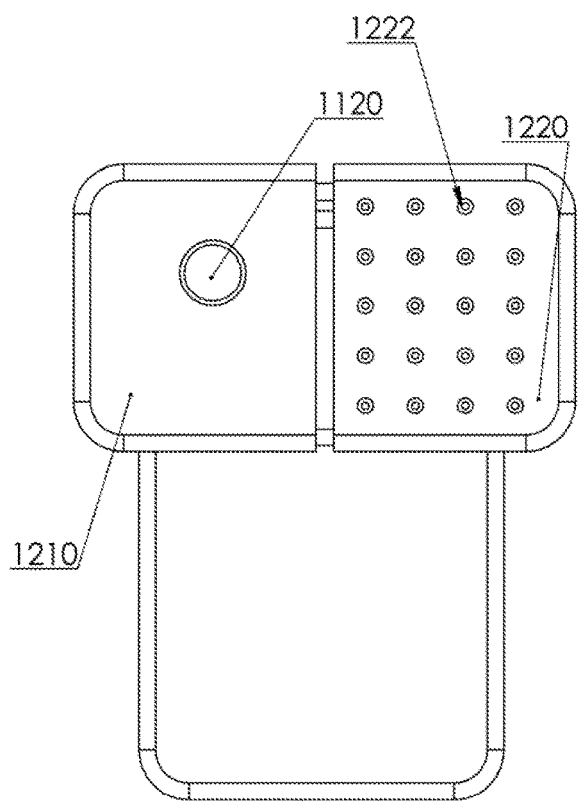
FIG. 26 depicts a rear view of the pathogen detection system of FIG. 23.

A method of using the pathogen detection module 1200 will now be described. Initially, the module 1200 is provided in a first condition, separate from a portable computer as shown in FIG. 24. The user draws the left and right portions apart with his hands and inserts a portable computer 1100 therebetween, urging the assembly together into a configuration as shown in FIG. 23. Upon such urging, a bluetooth transceiver within the pathogen detection module places itself in a mode receptive to pairing requests. The user then uses the portable computer screen and user interface to activate complementary software which pairs the bluetooth transceiver within the portable computer to the bluetooth transceiver within the pathogen detection module. The software provides a user the ability to initiate a scan upon interaction with the user interface, including for instance by actuating an on-screen button. Once the user initiates a scan, the software provides a choice of contaminants to scan for from which the user may select one or more options. The software then activates the LEDs 1222 and reads the input from the camera, using image processing to detect greater than ambient amounts of detection peaks for a given contaminant.

According to certain embodiments of the present disclosure, the array of LEDs is comprised of multiple LEDs having wavelengths appropriate for multiple pathogens (for instance 4 LEDs having an output of 420 nm for fecal matter, 4 LEDs having an output of 395 for blood, etc.) or alternatively, RGB LEDs whose output spectra may be adjusted. In either case, the software energizes the appropriate LEDs or portions of output spectra for the contaminants selected by the user.

Upon the display is an "augmented" reality type display which shows an overlay of the contaminated areas upon the normal scene seen by the camera. Additionally, the software displays a pass/fail grade determined by the overall amount of contaminant detected in the scene.

Figure 27:
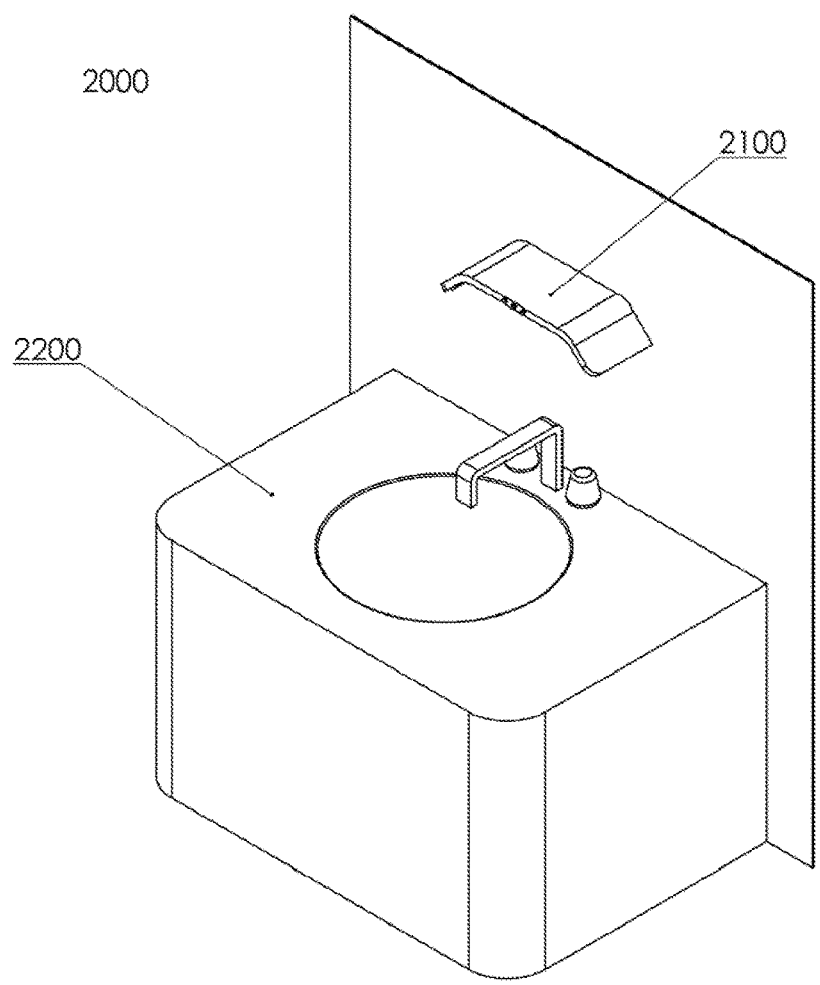
FIG. 27 depicts a top perspective view of a pathogen detection system mounted near a sink.
Figure 28:
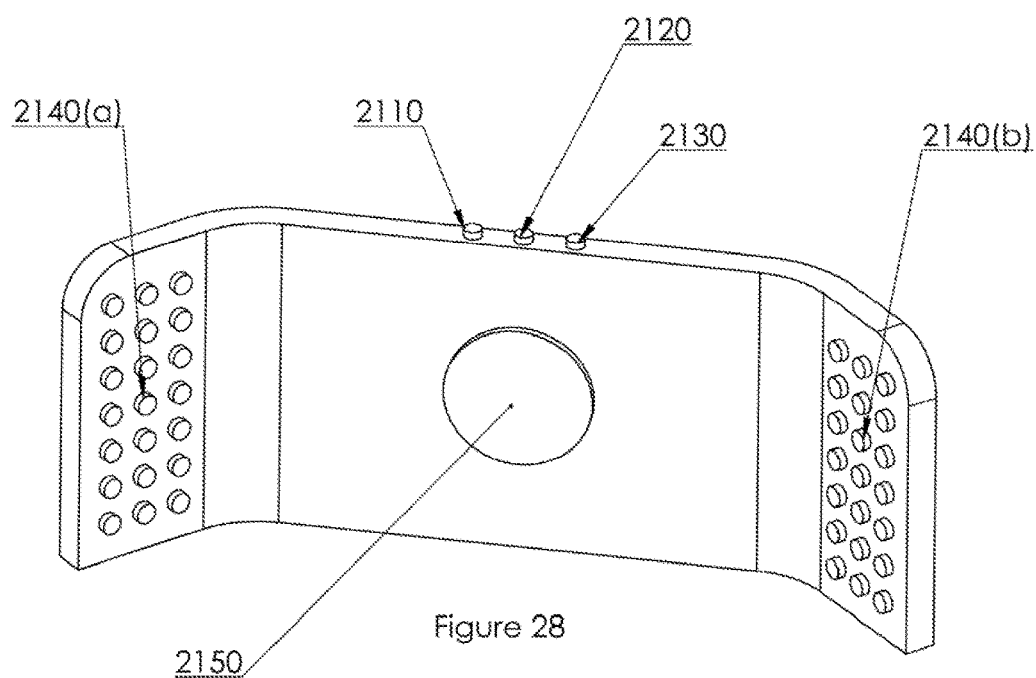
FIG. 28 depicts a bottom perspective view of the pathogen detection system of FIG. 27.

Referring now to FIGS. 27 and 28 together, a contaminant detection system 2000 includes a contaminant scanner 2100 disposed near a sink and faucet 2200. Contaminant scanner 2100 includes a camera 2150, an led indicator 2110, a microphone 2120, and a proximity sensor 2130. There are two banks of LEDS 2140(*a*) and (*b*) whose output is chosen for the inclusion of the appropriate excitation wavelength for a given pathogen. Camera 2150 has an optical filter between its lens and the scene therebelow, with the optical properties of the filter being chosen to selectively pass the detection wavelength of a chosen pathogen.

A method of using the contaminant detection system 2000 will now be described. Initially, the system is in a sleeping state, with an on-board CPU reading the output of the proximity sensor 2130 and the microphone 2120. If the CPU detects any of, the sound of water through the sink, a nearby toilet flushing, or a nearby door opening, the device is placed into a "ready" state with the LEDs energized and the CPU reading the output of the camera. According to further embodiments of the present disclosure, the device is placed into a "ready" state when the proximity sensor 2130 detects a person or object in front of the device. According to further still embodiments of the present disclosure, the proximity sensor 2130 faces down towards the object to be scanned rather than out towards a user.

Once the CPU detects, via the output of the camera 2150, that an object is in the field of view, that object and its spectra are analyzed for the presence of peaks for the selected contaminant(s). If the detected level of contaminants is below a threshold passing value, the LED indicator 2110 illuminates green indicating a passed test, and if the detected level of contaminants is above the threshold value, the LED indicator 2110 illuminates red, indicating a failed test and need to the user to wash their hands again and re-scan.

Figure 29:
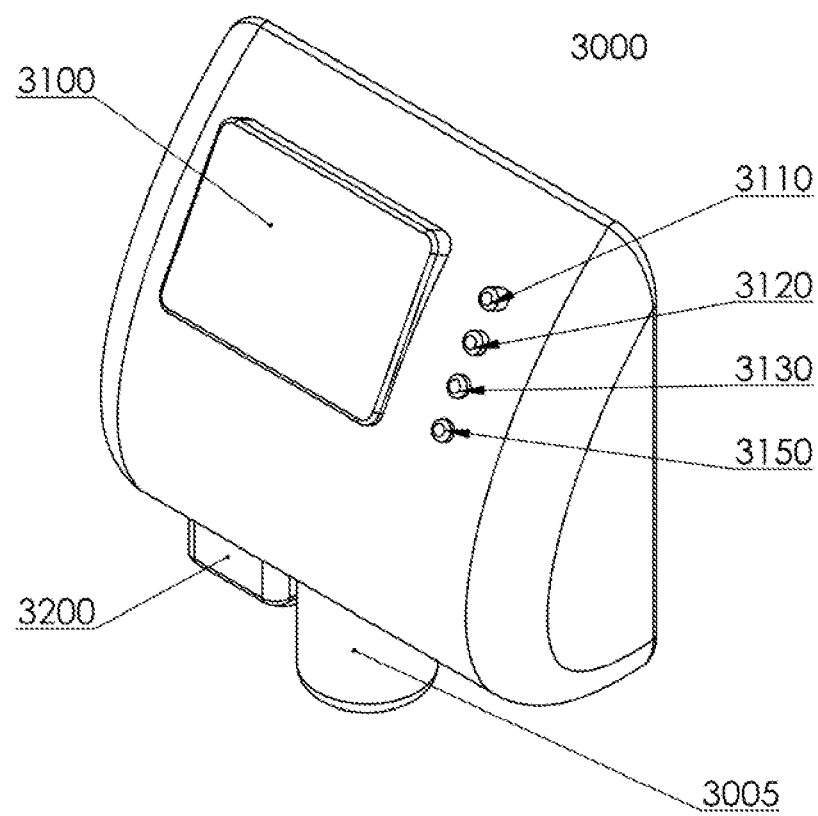
FIG. 29 depicts a perspective view of a pathogen detection system having an integrated electric hand dryer.
Figure 30:
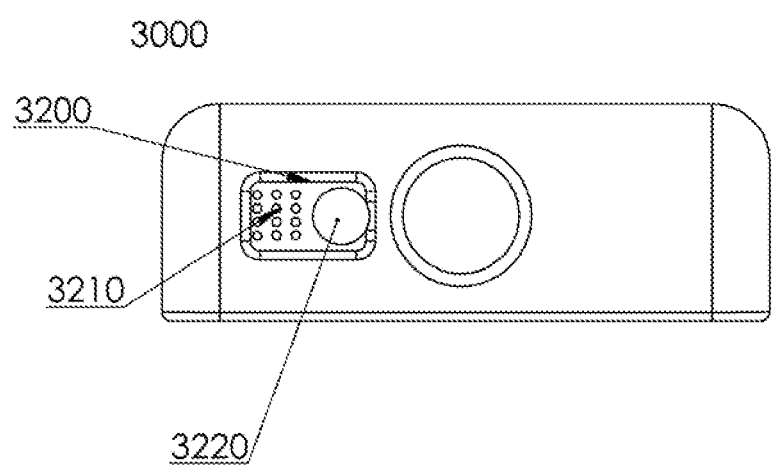
FIG. 30 depicts a bottom view of the pathogen detection system of FIG. 29.

Referring now to FIGS. 29 and 30 together, a pathogen detecting hand dryer 3000 is shown. Pathogen detecting hand drier 3000 has an air outlet tube 3005 from which hot air exits to affect drying. The electronic and mechanical elements which provide the drying functionality for a hand dryer are disclosed for instance in U.S. Pat. No. 6,038,786 which is incorporated by reference in its entirety. These components and their substantial equivalents shall be understood to comprise a "drying module" which provides a flow of air to remove water from the surface of a user's hands.

Further, there is a screen 3100, LEDs 3110, 3120, and 3130, a button 3150, and a sensing module 3200. Sensing module 3200 has a LED bank 3210 disposed on a downward face thereof, with the spectra of LED bank 3210 being chosen to detect one or more pathogens. There is a digital camera 3220 disposed upon sensing module 3200, with the digital camera having an optical filter placed between the camera and the scene therebelow, and the filter material being chose to selectively pass the detection wavelength of the appropriate pathogen or contaminant. There is a CPU within the body of the device which is electronically connected to the aforementioned components that provides software for controlling their respective functions.

A method of using a pathogen detecting hand drier 3000 will now be described. Initially, the hand drier is provided in a first, waiting condition with both the camera and drying module deactivated and waiting for input from a user. When a user is ready to dry his hands, he depresses button 3150 and places his hands directly below outlet tube 3005. Both the drying module and sensing module are activated. Upon such activation, the drying module passes warm air out from outlet tube 3005 and the LED bank 3210 is activated and the camera 3220 begins recording the scene. Upon the screen 3100, the CPU displays a near real-time view of a user's hands with any detected contaminant highlighted. If the CPU detects more contaminant than a permissible threshold, a "Failure" message is displayed upon the screen and LED 3120 is illuminated with red light and the user is urged to wash their hands again and repeat the scanning/drying process. If the CPU detects less contamination than a permissible threshold, a "Pass" message is displayed and LED 3120 is illuminated with a green light.

Figure 31:
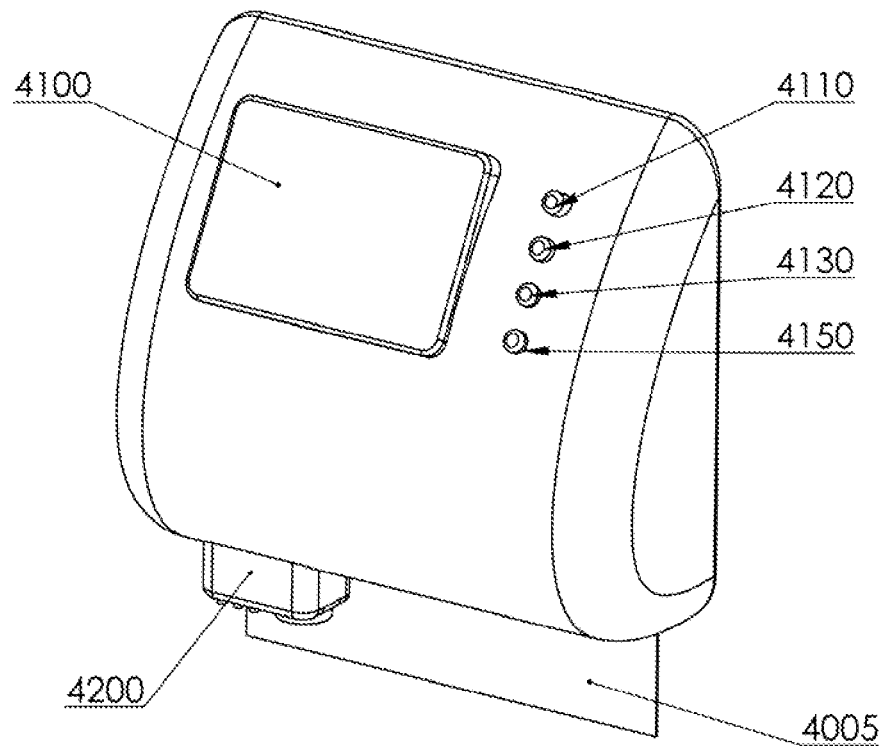
FIG. 31 depicts a perspective view of a pathogen detection system having an integrated towel dispenser.
Figure 32:
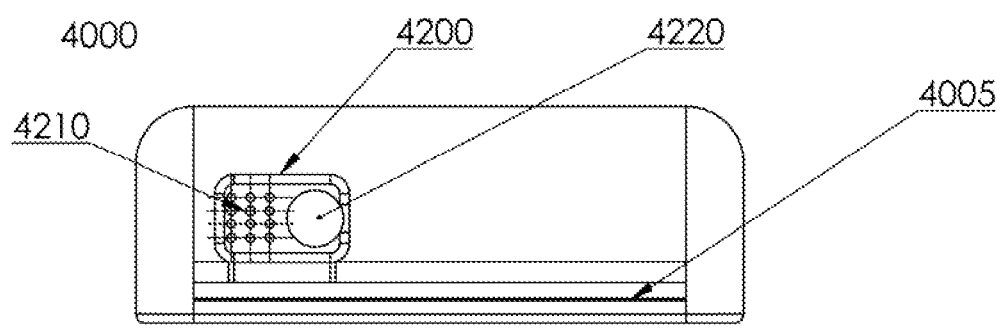
FIG. 32 depicts a bottom view of the pathogen detection system of FIG. 31.

Referring now to FIGS. 31 and 32 together, a towel dispensing pathogen detection system is shown. The system has a generally integral enclosure having a paper towel dispensing module disposed therewithin. An example of a towel dispensing module is disclosed in U.S. Pat. No. 5,772,291 which is incorporated by reference in its entirety and provides an example of the mechanical and electronic structures which provide the function of dispensing a portion of paper towel when a user's hands are placed therebelow. These features advance and eject a portion of paper towel from the bottom of the device, the leading end 4005 of which 4005 is shown in the figures.

Further, there is a screen 4100, LEDs 4110, 4120, and 4130, a button 4150, and a sensing module 4200. Sensing module 4200 has a LED bank 4210 disposed on a downward face thereof, with the spectra of LED bank 4210 being chosen to detect one or more pathogens. There is a digital camera 4220 disposed upon sensing module 4200, with the digital camera having an optical filter placed between the camera and the scene therebelow, and the filter material being chose to selectively pass the detection wavelength of the appropriate pathogen or contaminant. There is a CPU within the body of the device which is electronically connected to the aforementioned components that provides software for controlling their respective functions.

A method of using a towel dispensing pathogen detection system 4000 will now be described. Initially, the system is provided in a first, waiting condition with both the camera and drying module deactivated and waiting for input from a user. When a user is ready to dry his hands, he either depresses button 4150 or places his hands directly the device, triggering a motion sensor which dispenses a portion of towel. Either action activates the sensing module. Upon such activation, LED bank 4210 is activated and the camera 4220 begins recording the scene. Upon the screen 4100, the CPU displays a near real-time view of a user's hands or other object placed therebelow with any detected contaminant highlighted. If the CPU detects more contaminant than a permissible threshold, a "Failure" message is displayed upon the screen and LED 4120 is illuminated with red light and the user is urged to wash their hands again and repeat the scanning/drying process. If the CPU detects less contamination than a permissible threshold, a "Pass" message is displayed and LED 4120 is illuminated with a green light.

Figure 33:
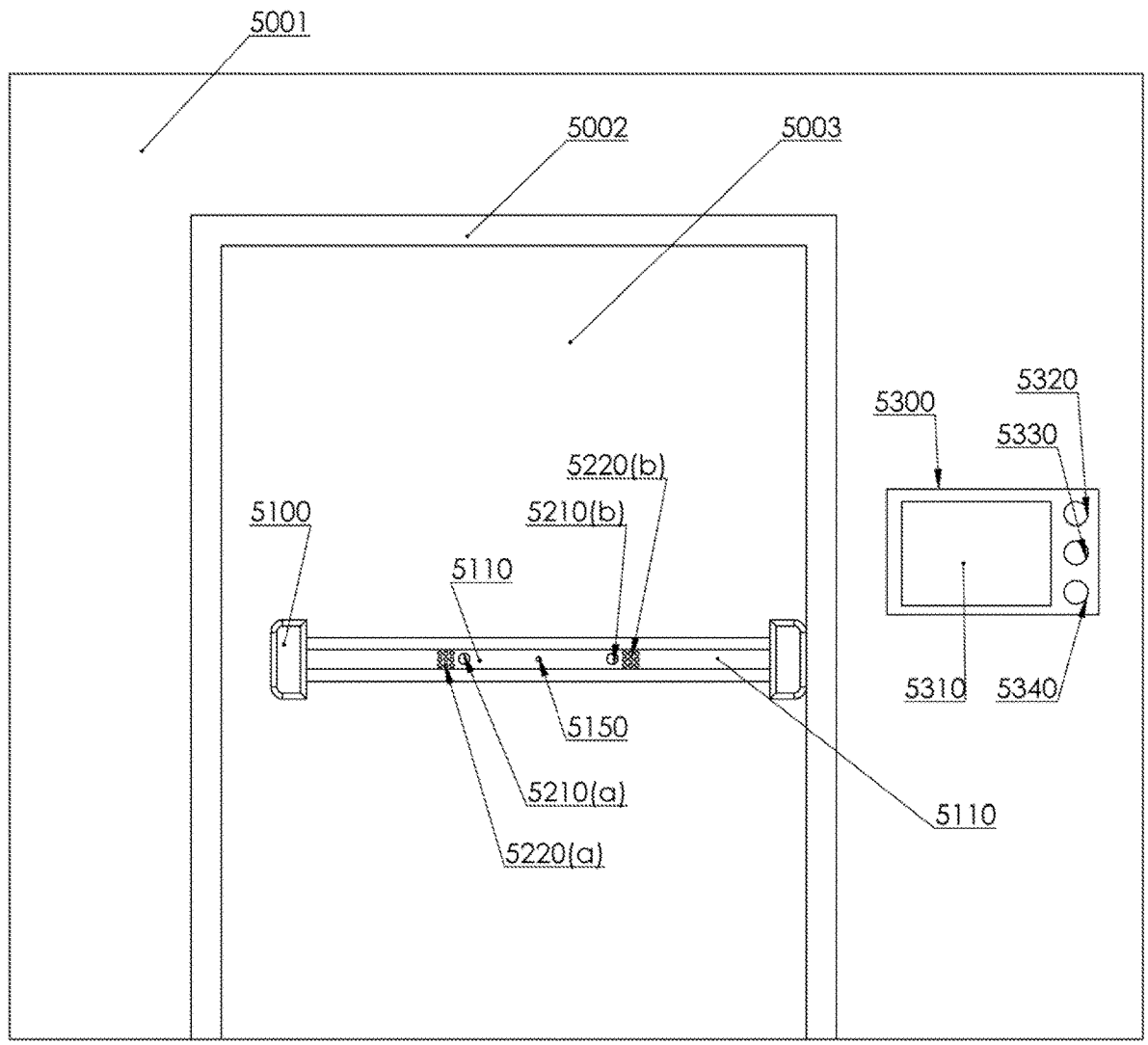
FIG. 33 depicts a front view of a pathogen detection system incorporating a push-style door handle.

Referring now to FIG. 33, a pathogen detecting presser bar 5100 is shown. Pathogen detecting presser bar 5100 is disposed upon a door 5003 which is hinged within a doorframe 5002, and is in turn attached to a wall 5001. There is a remote interface module 5300 disposed upon the wall 5001 near the doorframe 5002.

The pathogen detecting presser bar 5100 comprises a presser bar having integrated pathogen detecting elements as well as feedback elements to report the results of the pathogen detection a user. Examples of the mechanical components of presser bars that provide locking and unlocking functionality are disclosed for instance in U.S. Pat. No. 3,819,213 (a level-style presser bar) and U.S. Pat. No. 6,000,733 (a panel-style presser bar) which are incorporated by reference herein in their entirety. Presser bar 5100 has a pusher plate 5110 disposed on a proximal face thereof and positioned to be urged forward by a user. Upon the pusher plate, there are disposed two detection cameras 5210(*a* and *b*) and two LED banks 5220(*a* and *b*). There is a proximity sensor 5150 disposed near the center of the pusher plate 5110 and configured to detect the presence of a person in front of the door 5003.

As discussed previously in connection with other embodiments of the present invention, the output spectra of the LED banks and filtering characteristics of the cameras and their lenses are chosen to detect the presence of certain pathogens on a surface disposed directly in front of the camera(s), including for instance a user's hands. The results of these scans are shown on an interface module 5300 disposed remotely from the presser bar 5100, including for instance upon a wall next to a door as shown in FIG. 33. Interface module 5300 includes a housing having a screen 5310 speaker 5320, and LEDs 5330 and 5340 protruding therefrom. There is a CPU disposed therein in electronic communication with the aforementioned components. Communication between the elements of the system disposed upon the door 5003 and the wall 5001 may be either wired or wireless so long as it has sufficient bandwidth to affect the functionality of the given embodiment of the present invention.

A method of using the pathogen detecting presser bar 5100 will now be described. As a user approaches the device, the proximity sensor 5150 detects his presence and alerts the user that a scan must be passed in order for the door to be unlocked. This "alert" is simultaneously communicated via both speaker 5320 and screen 5310. Upon such communication, the LED arrays 5220(A and b) are activated and the CPU actively begins reading the scene as recorded by the cameras 5210(*a* and *b*). The user is instructed, again via the screen 5310 and speaker 5320 to move his hands into the field of view of the camera(s). Once the surface of the user's hands has been imaged, the CPU displays upon the screen the areas where the contaminant(s) is present. If the total quantity of contaminant is below the allowable threshold, the screen and LEDs 5320 and 5330 communicate said information to the user and unlock the door.

Figure 34:
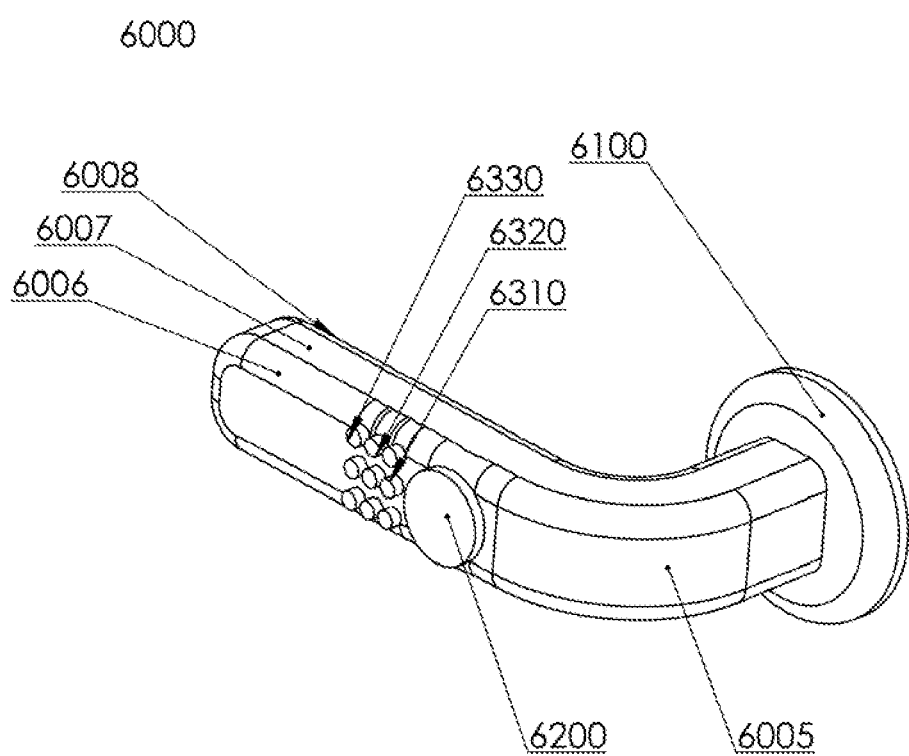
FIG. 34 depicts a perspective view of a pathogen detection system incorporating a lever-style door handle.

Referring now to FIG. 34, a door handle 6000 is shown. Door handle 6000 comprises a door lever body 6005, with the body having an electrically conductive proximal panel 6006, an electrically conductive distal panel 6008, and an electrically insulating barrier 6007 therebetween. Panels 6008 and 6009 are electronically connected so as to provide an inductive sensor for detecting the presence of a user's hand. There is a faceplate 6100 for joining the assembly to a door. There is a camera 6200 extending from the proximal face of panel 6006 as well as a detection LED array 6310, a speaker 6320, and an indicator led 6330. A CPU and battery are disposed within the body of the device and provide electronic connectivity and control for the aforementioned parts.

A method of using door handle 6000 will now be described. Handle 6000 is provided in a first condition where all of the sensors and displays except for the capacitance sensor are in a resting/inactive state. Once a user places his hand about the handle or sufficiently close thereto, the CPU reads a change in the state of the capacitance sensor. As a result, the camera and detection LED array are activated and the sensor begins reading the input from the camera. Audible alters from speaker instruct the use to move his hand toward or away from the camera until the hands comes into focus and can be imaged. The distance of the hand to the camera is determined by methods known in the arts, including contrast detection of the image recorded by the camera, output of the capacitive sensor, or output of an additional proximity/distance sensor. Once a scan has been recorded, the CPU determines whether the amount of contaminant present is more or less than the allowable threshold and communicates that result to the user, including via the speaker or LEDs. According to certain further embodiments of the present disclosure, In some embodiments, the device may integrate multiple wavelength peaks detected to increase specificity (may view ratios). As progression occurs in improving sensitivity and specificity of detection, the device may include additional wavelengths for excitation and detection. These detection wavelengths may be analyzed with separate thresholds, or together by thresholding a formulaic combination of the intensities. The device may also choose to include a detection wavelength that does not specifically fluoresce to serve as a "background emission" measurement. The device may also incorporate an overall RGB intensity as a control, as measured by a non-filtered standard camera lens.

In some embodiments, the device may detect additional contamination sources in addition to fecal matter. It may have the ability to detect multiple contamination points at one time, or to take multiple images and process them to indicate various sources of contamination. Some examples of future detection include mycotoxins (Excitation at 780 nm, threshold the ratio of 475-550/400-475), Fungal Spores Ochratoxin A (Excitation 330-390 nm (356), threshold around 440-480 nm), and Zearalenone (Excitation 780 nm, detection 385 nm). The combination of detection tools using visible light fluorescent spectroscopy would increase the ability for the device to specify all contamination. It would continue to use the same hardware and software system indicated in this patent, but would use the excitation and threshold ratios described in this section [0027].

In some embodiments, the device can use trends to show management pain points, problem locations, or employees. Some methods include: Implementation of employee IDs for tracking, Implementation of RFID for tracking, fingerprint or palm scanning authentication for tracking of users, targeted feedback at the end of a user session (i.e. number of failed checks, common locations of failed checks on hand or surface).

In some embodiments, the device can include the use of motion detection or voice activation to make a hands free device. Some methods include motion detection sensors implemented below device scanning location so that when a hand is waved under the device (where scanning would occur) the software process can automatically begin creating a hands free experience, or a voice recognition software that would allow employees to state their name or employee ID and would then begin the software process of scanning hands or surfaces, allowing again for a fully hands free experience.

In some embodiments, the device can include automated correction (action taken when device notices a failure which requires implementation and technological communication with outside systems/devices. Some methods include scanned items do not leave conveyer belt when a check is failed, door to kitchen does not open when a check is failed, noise/light alerts to management, text alerts to management systems.

In some embodiments, the device can increase user engagement through active display or visualization techniques. Some examples include 3D Scanning of hands, objects, or surfaces to detect pain points in hard to visualize locations, Implementation of 3D scanning existing technologies for a more detailed display, and ability to visualize precise, specific locations (i.e., under fingernails). Other examples include the use of Virtual Reality/Augmented Reality devices, the ability to visualize contamination overlaid on actual surface through augmented reality technologies, and the use of virtual reality to see areas throughout location with contamination.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A system for contamination detection, the system comprising:
    an apparatus adapted with a first function and a second function, the first function corresponding to enabling operability of a mechanism requiring a hand-related motion, the second function corresponding to a computer processing step for detection of a contamination, wherein the first function is disabled upon detecting a failed state in the second function;
    a camera, an optical filter disposed in the field of view of the camera, an LED light emitter array oriented into the field of view of the camera, a sensor activation device, and a feedback device; and
    a processing device communicatively coupled to at least the camera, the LED light emitter array, the sensor activation device and the feedback device, the processing device configured to: (1) initiate the system, upon detecting a change in state in the sensor activation device, for performing a scan; (2) activate the LED light emitter array to generate an excitation wavelength for a known contaminant; (3) capture a plurality of near-simultaneous images to analyze an emission wavelength selectively passed by the optical filter to the camera for determining the presence of the known contaminant in amounts greater than a detection threshold value; and (4) communicate results of the analysis on the feedback device based at least in part on a comparison of a pixel intensity level in the plurality of images and the detection threshold value;
    wherein at least the processing device is housed in the apparatus.

2. The system of claim 1, wherein the apparatus is an enclosure module adapted to receive a mobile device, the enclosure module comprising an affixation element to detachably secure the mobile device.

3. The system of claim 2, wherein the LED light emitter array is integrated in the enclosure module in support of the second function.

4. The system of claim 2, wherein enclosure module is configured to orient a camera of the mobile device secured therein in support of the second function.

5. The system of claim 1, wherein the apparatus is a hand drying device configured to dispense a towel or provide a stream of air in support of the first function.

6. The system of claim 5, wherein the sensor activation device and the LED light emitter array are integrated in the hand drying device in support of the second function.

7. The system of claim 1, wherein the apparatus is a door engagement mechanism for permitting access through an entryway in support of the first function.

8. The system of claim 7, wherein the door engagement mechanism is a door presser bar or a door handle.

9. The system of claim 7, wherein the sensor activation device and the LED light emitter array are integrated in the door engagement mechanism in support of the second function.

10. The system of claim 1, wherein the analysis comprises overlaying the plurality of images to identify a location of the known contaminant.

11. The system of claim 1, wherein the sensor activation device is a proximity sensor.

12. The system of claim 1, wherein the feedback device is a display screen.

13. The system of claim 1, wherein the analysis is based on the emission wavelength measured from scanning the user's hands positioned in proximity to the LED light emitter array integrated in the apparatus.

14. The system of claim 1, wherein the contaminant is an allergen, a toxin, a bodily fluid, fecal matter, or fungus indicative of spoilage, each of the contaminants having particular excitation and corresponding emission wavelengths.

* * * * *